United States Patent
Masuda et al.

(10) Patent No.: US 7,179,040 B2
(45) Date of Patent: Feb. 20, 2007

(54) LUGGAGE STORAGE STRUCTURE FOR AUTOMOBILE AND LIFTER

(75) Inventors: Toshio Masuda, Tokyo (JP); Atsushi Atake, Tokyo (JP); Masahiko Inoue, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/776,187

(22) Filed: Feb. 12, 2004

(65) Prior Publication Data

US 2004/0160076 A1   Aug. 19, 2004

(30) Foreign Application Priority Data

Feb. 17, 2003  (JP)  ............................. 2003-038449
Feb. 17, 2003  (JP)  ............................. 2003-038460
Feb. 17, 2003  (JP)  ............................. 2003-038486

(51) Int. Cl.
  *B60P 9/00*   (2006.01)
  *B60P 1/00*   (2006.01)
  *B66F 7/06*   (2006.01)
  *B66F 3/22*   (2006.01)

(52) U.S. Cl. ...................... 414/462; 414/540; 414/495; 414/522; 414/641; 187/211; 187/269; 254/122

(58) Field of Classification Search ................ 414/541, 414/558, 921, 462, 495, 522, 540, 641; 254/122; 296/37.3, 37.14
See application file for complete search history.

(56) References Cited

U.S. PATENT DOCUMENTS

| | | | | |
|---|---|---|---|---|
| 2,249,845 A * | 7/1941 | Mitchell | .................. | 297/158.4 |
| 3,752,331 A * | 8/1973 | Colburn | ...................... | 414/678 |
| 4,134,504 A * | 1/1979 | Salas et al. | .................. | 414/558 |
| 4,221,280 A * | 9/1980 | Richards | ...................... | 187/269 |
| 4,890,692 A * | 1/1990 | Oakman | ...................... | 182/141 |
| 4,958,979 A * | 9/1990 | Svensson | ...................... | 414/549 |
| 4,969,793 A * | 11/1990 | Pawl | ........................... | 414/462 |
| 5,054,578 A * | 10/1991 | Smillie et al. | ............. | 182/69.4 |
| 5,080,417 A | 1/1992 | Kanai | | |
| 6,045,317 A * | 4/2000 | Boucher et al. | ............ | 414/495 |
| 6,098,961 A * | 8/2000 | Gionet | ........................ | 254/122 |
| 6,257,372 B1 * | 7/2001 | Schirmer | .................... | 187/269 |
| 6,398,479 B1 * | 6/2002 | Dupuy et al. | ............... | 414/540 |
| 2002/0070574 A1 * | 6/2002 | Carlsson et al. | ......... | 296/37.14 |

FOREIGN PATENT DOCUMENTS

JP  9-290995  11/1997
JP  2002-240634  8/2002

* cited by examiner

*Primary Examiner*—Eileen D. Lillis
*Assistant Examiner*—Gregory Adams
(74) *Attorney, Agent, or Firm*—McGinn IP Law Group, PLLC.

(57) ABSTRACT

A luggage storage structure for an automobile includes: a storage concave portion formed so as to project downward on a floor panel and capable of storing luggage, a plate member for approximately closing an upper part of the storage concave portion, and a transfer mechanism for transferring the plate member approximately up and down in an upper part of the floor panel. The luggage structure is securely protected by the plate member and the transfer mechanism.

11 Claims, 16 Drawing Sheets

LUGGAGE STORAGE STRUCTURE FOR AUTOMOBILE AND LIFTER

BACKGROUND OF THE INVENTION

1. Field of the Invention

The present invention relates to a luggage storage structure for an automobile for storing a luggage in a storage concave portion formed in a floor panel, and a lifter for transferring a plate member for the luggage at least upwardly and downwardly.

2. Description of Related Art

Heretofore, as this type of luggage storage structure for an automobile, it is known that a tray for storing a luggage is disposed in a storage concave portion formed in a floor panel (For example, Japanese Patent Application Publication (Unexamined) Tokukaihei-2002-240634). The tray is structured so as to extend and contract in a horizontal direction and a length of the horizontal direction is changed in accordance with usage purposes. In this kind of the luggage storage structure, an upper part of the storage concave portion is open and the luggage is mounted and removed in any directions as required on the tray at any time.

However, in the above luggage storage structure for the automobile, because the luggage on the tray is exposed inside the vehicle, the luggage or the like is visible from outside of the vehicle. In other words, the luggage storage structure cannot keep the luggage secret.

Moreover, when a thief or the like smashes the key and sneaks to the vehicle, the exposed luggage cannot be secured.

Heretofore, a known lifter of an earlier development transfers two links respectively from and to a horizontal state to/from a raised state so as to raise and lower the plate member with respect to the predetermined surface. The two links are connected to a lower position of the plate member on which the luggage is mounted. The two links are connected so as to rotate and form an X-shape. (Japanese Patent Application Publication (Unexamined) Tokuganhei-9-290995)

Each link is formed as the same length and linked each other at the middle point in a longitudinal direction. One end side of one link is connected with the plate member so as to rotate, and the other end is connected with the predetermined surface side so as to transfer in the horizontal direction. Further, one end side of the other link is connected with the predetermined surface side so as to rotate. The other end side is connected with the plate member so as to transfer in the horizontal direction. Each link is driven so as to transfer appropriately from and to the approximately horizontal state to and from the approximately raised state by a driving member. In the lifter, each link having the same length is linked so as to rotate at the middle point in the longitudinal direction each other, and the plate member transfers upwardly and downwardly.

In the above lifter, however, because the plate member transfers just upwardly and downwardly, the lifter cannot be disposed therein unless the vertical stroke of the plate member is secured. In other words, the lifter has a drawback of being unavailable, for example, in a narrow space sloped in an upper position, such as a loft of a house and a trunk room of the automobile.

In addition, when the luggage is transferred between the stepped lower horizontal surface and the stepped upper horizontal surface, the lifter is disposed on the horizontal surface of a lower position. In this case, however, a constraint requires forming an approximately perpendicular sidewall between the lower horizontal surface and the upper horizontal surface. In other words, for example, if the middle portion of the sidewall slopes at more than or equal to 90° so as to obliquely project, the projecting portion interferes the plate member. On the other hand, if the upper part of the side wall slopes at less than or equal to 90°, a gap occurs between the upper horizontal surface and the plate member when the plate member is transferred upwardly. Both cases undermine a transfer capability for the luggage.

Like this, because the transfer direction of the plate member is limited to just upwardly and downwardly, the lifter is quite inconvenient for practical uses.

SUMMARY OF THE INVENTION

The present invention has been made in view of above points. An object of the present invention is to provide a luggage storage structure for an automobile capable of reliably securing the luggage stored in a storage concave portion.

Another object of the present invention is to enhance the transfer flexibility of a plate member by transferring the plate member not only in the vertical direction but in the horizontal direction.

In order to solve the above problems, in accordance with a first aspect of the present invention, a luggage storage structure for vehicle, comprising:

a storage concave portion formed to project downward on a floor panel;

a plate member for closing an upper part of the storage concave portion; and a transfer mechanism for transferring the plate member up and down in an upper part of the floor panel.

a pair of rail frames fixed on a floor panel side and being parallel to each other;

a pair of drive links, one end side of the drive links being connected with a rail frame side so as to transfer in a longitudinal direction of the rail frame, the other end side being connected with a plate member side, the drive links being horizontal when the plate member closes the storage concave portion, and the drive links being raised when the plate member is transferred upward;

a pair of driven links, both end sides of the driven links being connected with the plate member side and the floor panel side, a middle side of the driven links being connected with the drive link so as to rotate, the driven links being horizontal when the plate member closes the storage concave portion and the driven links being raised when the plate member is transferred upward;

a plurality of sliders capable of transferring in the longitudinal direction of the rail frame, the sliders engaging with a drive link side; and a driving mechanism for transferring each slider in the longitudinal direction of the rail frame;

wherein each drive link and each driven link shift between an approximately horizontal state and a raised state by transferring one end side of each drive link along the rail frame.

According to the first aspect of the present invention, in addition to the above function, when the driving member is driven and each slider is transferred in one of the longitudinal directions of the rail frame, one end side of each drive link integrally transfers with each slider. Thereby, each drive link and each driven link form an approximately X-shape and are raised.

Likewise, when the driving member is driven so as to transfer each slider in the other direction of the longitudinal direction of the rail frame, one end side of each drive link integrally transfers with each slider. Thereby, each drive link and each driven link are approximately horizontal.

Therefore, because the plate member is transferred upwardly and downwardly by transferring one end side of each drive link in the longitudinal direction of the rail frame, the plate member can be smoothly transferred upwardly and downwardly. Further, two links of each drive link and each driven link can support the plate member so as to stably support the plate member.

According to the present invention, the storage concave portion is approximately closed by the plate member. The luggage can be stored in the storage concave portion by transferring the plate member upwardly.

Therefore, the luggage stored in the storage concave portion cannot be removed because the storage concave portion is approximately closed by the plate member. In other words, when a thief or the like smashes a key and sneaks to the vehicle for example, the luggage can be reliably secured. Further, because the luggage is approximately reliably covered by the plate member, the luggage can be kept secret in the vehicle.

Preferably, the storage concave portion is a spare tire storage portion, the plate member transferring approximately up and down in a luggage space of said vehicle.

According to the present invention, in addition to the above function, the luggage is stored in an upper part of the spare tire stored in the spare-tire storage portion. Further, because the plate member transfers upwardly, the plate member approximately separates the luggage space into the upper portion and the lower portion. At this time, the luggage can be mounted on the plate member as well as the floor panel side such as the storage concave portion.

Therefore, an old spare-tire storage portion of prior arts formed on the floor panel is used so as to store the luggage. Further, by transferring the plate member upwardly, the luggage can be mounted on both of the floor panel side and the plate member. Because the luggage capacity of the luggage space is additionally increased, the luggage storage structure is convenient for the practical use.

Preferably, the luggage storage structure further comprising:

a contacting portion capable of contacting with the slider side, is formed on the rail frame side of each drive link;

a contacting surface sloped upward in a transfer direction of the slider and contacted with the contacting portion when the drive link is raised from the horizontal state, and a rotary connecting portion capable of connecting with the rail frame side of the drive link so as to rotate, an initial transfer zone of the contacting portion for contacting with the contacting surface so as to transmit a driving force of the slider to the drive links; and a normal transfer zone provided for the driving force to be transmitted from the slider through the rotary connecting portion to the drive links.

According to the present invention, in addition to the above function, when the plate member is approximately closing the storage concave portion and the drive link is approximately horizontal and when the driving member is driven so as to transfer the slider, this slider transfers in an initial transfer zone and a normal transfer zone, and the plate member is transferred to the upward position.

When the slider transfers in the initial transfer zone, the contacting surface of the slider contacts with the contacting portion of the drive link. At this time, the contacting surface of the slider is sloped upward in the transfer direction. Thereby, the contacting portion is raised as the slider transfers. The slider passes the initial transfer zone, before the drive link is raised to the predetermined angle.

Further, when the slider transfers in the normal transfer zone, the rotary connecting portion of the slider is connected with the rail frame side of the drive link so as to rotate. Thereby, the rail frame side of the drive link transfers as the slider is transferring and the plate member side of the drive link transfers in the opposite direction of the rail frame side. Each driving and driven links form the approximately X-shape and is raised.

Therefore, in the initial transfer zone, the driving force of the slider is converted from the approximately horizontal direction to the approximately upward so as to transmit an approximately upward force to the drive link which is approximately horizontal. At this time, without a link mechanism or the like for example, a direct contact between the drive link and the slider transmits the driving force. Thereby, the space for the link mechanism or the like is not necessary between the rail frame and the plate member.

Further, when the slider passes the initial transfer zone and the drive link is raised just at the predetermined angle, the rotary connecting portion and the driving rink are connected, and the rail frame side of the drive link is transferred with the slider in the approximately horizontal direction. Thereby, the drive link can be raised more higher.

Preferably, the luggage storage structure further comprising:

an electric motor in the driving mechanism, wherein:

two electric motors are disposed, and each slider is independently driven by each electric motor.

According to the present invention, in addition to the above function, the slider can be stably transferred by the electric motor so as to smoothly transfer the plate member upwardly and downwardly.

Further, each slider is separately controlled so as to reduce the load of each electric motor and increase the luggage capacity of the plate member.

Further, when the luggage is lopsidedly or inclinedly mounted on the plate member and so forth, the output torque of each electric motor can be changed on the basis of the weight distribution applied from the plate member to each right or left links.

Preferably, the luggage storage structure further comprising:

a plate member frame for supporting the plate member, the plate member frame being connected with each drive link and each driven link, and the plate member frame transferring in a predetermined direction with respect to each drive link and each driven link; and a driving member for transferring the plate member frame in the predetermined direction.

According to the present invention, in addition to the above function, the driving member is driven so as to transfer the plate member and frame in the predetermined direction with respect to each drive link and each driven link.

Therefore, a passenger can transfer the plate member in accordance with usages. For example, when the luggage mounted on the plate member is taken out from the vehicle or when the luggage taken out from the vehicle is mounted on-the plate member, the driving member is driven so that the passenger can transfer the plate member in front of him or her to handle the luggage.

Preferably, the luggage storage structure further comprising:

a plate member frame for supporting the plate member, the plate member frame being connected with each drive link and each driven link;

a lock portion for locking the plate member and the plate member frame; and a lock mechanism having an operating portion capable of unlocking the lock portion, the operating portion of the lock mechanism being disposed on a lower surface of the plate member.

According to the present invention, in addition to the above function, the plate member is fixed through the plate member frame to each driving or driven link. A passenger can unlock the fixation between the plate member and the plate member frame and take the plate member out of the vehicle by using the operating portion for unlocking the lock.

Here, when the plate member is approximately closing the storage concave portion, the passenger cannot reach inside the storage concave portion nor operate the operating portion disposed on the lower surface of the plate member. In other words, when the plate member is transferred upward, the plate member is unlocked.

Therefore, the passenger can use the plate member for not only approximately closing the storage concave portion but also removing the plate member outside the vehicle to use it as a top panel of a table or the like.

Further, when the storage concave portion is approximately closed, the fixation between the plate member and frame cannot be unlocked. For example, by removing the key of the vehicle and setting the closed locking mechanism impossible to be unlocked, even when a thief or the like smashes or breaks the key and sneaks inside the vehicle, the luggage stored in the storage concave portion can be reliably secured.

In accordance with a second aspect of the present invention, a luggage storage structure for an automobile, comprises: a storage concave portion formed so as to project downward on a floor panel and capable of storing the luggage; a closed locking mechanism for locking the plate member at the position where an upper part of the storage concave portion is approximately closed; and a transfer biasing member for biasing the plate member so that it can be transferred upward.

According to the second aspect of the present invention, the storage concave portion is approximately closed by the plate member. By transferring the plate member upward, the luggage can be stored in the storage concave portion. The plate member is locked by the closed locking mechanism when approximately closing the storage concave portion. When the closed locking mechanism is unlocked, the plate member is transferred upward by the biasing force of the transfer biasing member. For example, a user or the like applies a downward force and so forth to the plate member transferred upward. Thereby, the plate member transfers downward to the position where the storage concave portion is approximately closed, and the plate member is locked by the close locking mechanism.

Therefore, the luggage stored in the storage concave portion cannot be reached because the storage concave portion is approximately closed by the plate member. In other words, when the thief or the like smashes or breaks the key and sneaks inside the vehicle, the exposed luggage can be reliably secured. Moreover, the luggage is approximately reliably hidden by the plate member so as to keep the luggage secret inside the vehicle.

Preferably, the storage concave portion is a spare-tire storage portion, and the plate member transfers approximately upwardly and downwardly in the luggage space of a vehicle.

According to the present invention, in addition to the above function, the luggage is stored in an upper portion of the spare tire stored in the spare tire storage portion. Further, the plate member transfers upward, and thereby the plate member approximately separates the luggage space into the upper portion and the lower portion. At this time, the luggage can be mounted not only on the floor panel side such as the storage concave portion but also on the plate member.

Therefore, the luggage can be stored by using the usual (or ordinary) spare tire storage portion formed in the floor panel. Further, the luggage can be mounted on both the floor panel side and the plate member by transferring the plate member upward. Thereby, because the luggage capacity of the luggage space is additionally increased, the luggage storage structure is quite convenient for practical uses.

Preferably, the transfer mechanism comprises: a pair of rail frames which is fixed on the floor panel side and which is approximately parallel to each other; a pair of main links, one end side of the main links being connected with the rail frame side so as to transfer in the longitudinal direction of the rail frame, the other end side being connected with the plate member side so as to transfer in the longitudinal direction of the rail frame, the main links being approximately horizontal when the plate member closes the storage concave portion, and the main links being raised when the plate member is transferred upward; and a pair of driven links, both end sides of the driven links being connected with the plate member side and the floor panel side so as to rotate, the middle side of the driven links being connected with the main link so as to rotate; wherein each main link shifts between the approximately horizontal state and the approximately raised state by transferring one end side of each main link along the rail frame.

According to the present invention, in addition to the above function, as one end side of each main link transfers from one end side of each rail frame to the other end side thereof and the other end side of each main link transfers opposite to one end side of each main link, each main and driven link form approximately an X-shape and are raised. Further, as one end side of each main link transfers from the other end side of each rail frame to one end side of each rail frame, each main and driven link are approximately horizontal.

Therefore, both end sides of each main link transfer in the longitudinal direction of the rail frame so that the plate member transfers up and down. Thereby, the plate member can be smoothly transferred up and down. Further, the plate member can be supported by two links of each main and driven links so as to stably support the plate member.

Preferably, the luggage storage structure further comprises a positioning mechanism capable of locking the plate member at the multistage vertical positions.

According to the present invention, in addition to the above function, the plate member biased upward can be locked at each of the random vertical positions. Therefore, in accordance with the size of the luggage stored in the luggage space, the vertical position of the plate member can be adjusted and the vertical separating position of the luggage space can be easily adjusted.

Preferably, the positioning mechanism has a height adjustable operating portion capable of unlocking and the height adjustable operating portion is disposed inside an aperture which is formed on the plate member and grasped by hand.

According to the present invention, in addition to the above function, the user or the like can grasp the aperture which is formed on the plate member and grasped by hand, and transfer the plate member. Further, if this plate member is structured to be removable from each main or driven link side, the user can use and grasp the aperture so as to transfer the plate member separated from each link.

Further, the user or the like can use the height adjustable operating portion disposed inside the aperture, so as to unlock the plate member from the positioning mechanism and adjust the height of the plate member. Here, because the height adjustable operating portion is disposed inside the aperture, the luggage or the like mounted on the plate member cannot contact with the height adjustable operating portion.

Therefore, because the plate member can be handled by using the aperture, the luggage storage structure additionally enhances the convenience for the user. Further, the luggage or the like cannot contact with the height adjustable operating portion nor unlock the lock. Thereby, the positioning mechanism can securely lock the plate member.

Preferably, the transfer biasing member has a gas stay which extends and contracts between the plate member and the rail frame side.

According to the present invention, in addition to the above function, the plate member is biased upward by the gas stay having the biasing force of the extending direction. Here, as the plate member transfers upward, the gas stay smoothly extends. Thereby, the plate member cannot be suddenly moved when the close locking mechanism is unlocked.

Further, when the plate member transfers downward so as to approximately close the storage concave portion, the gas stay contracts. At this time, the gas stay is contracted with respect to the biasing force. Thereby, when the plate member is transferred downward, the plate member cannot be suddenly moved.

Therefore, the plate member can be smoothly transferred up and down so that the user can reliably transfer the plate member. Further, because the plate member cannot be suddenly moved, an excess load does not occur in the transfer mechanism. Thereby, the reliability and the durability of the transfer mechanism can be additionally enhanced.

Preferably, the gas stay is fixed on the rail frame side so as to rotate, and the gas stay is approximately horizontal when the plate member closes the storage concave portion and is raised when the plate member is transferred upward, and the luggage storage structure has an initial biasing member for biasing the plate member approximately upward when the gas stay is approximately horizontal.

According to the present invention, in addition to the above function, the gas stay that is approximately horizontal when the storage concave portion is approximately closed by the plate member is gradually raised as the plate member transfers upward. Here, because the gas stay has the biasing force of the extending direction, the angle between the plate member and the gas stay is increased so as to increase the upward biasing force as the gas stay rises. Further, when the gas stay is approximately horizontal, the biasing force is applied in the approximately horizontal direction. In other words, when the plate member is approximately closing the storage concave portion, the biasing force of the gas stay is not applied upward at all.

When the storage concave portion is approximately closed by the plate member, the biasing force of the initial biasing member is applied to the plate member side. Thereby, when the closed locking mechanism is unlocked, the plate member is transferred upward by the initial biasing member. Further, the gas stay is raised and the upward biasing force that is applied from the gas stay to the plate member side increases, before the plate member is transferred upward by the biasing force of the gas stay.

Therefore, as the plate member rises, the biasing force of the gas stay increases. When the storage concave portion is opened, the plate member is slowly raised. After the plate member is raised at the predetermined height, it is stably raised. Further, when the storage concave portion is approximately closed by the plate member, the biasing force of the gas stay is not applied upward to the plate member side at all. But the plate member can be raised by the initial biasing member to the position where the biasing force of the gas stay is applied.

Preferably, the luggage storage structure further comprises: a plate member frame for supporting the plate member, the plate member frame being connected with each main and driven links; a fix locking mechanism comprising: a fixed locking portion for locking the plate member and the plate member frame, and a fixed releasing portion capable of unlocking the fixed locking portion, wherein the fixed releasing portion of the fix locking mechanism is disposed on a lower surface side of the plate member.

According to the present invention, in addition to the above function, the plate member is fixed through the plate member frame to each main and driven links. By unlocking the fixed releasing portion, the user can unlock the fixation between the plate member and the plate member frame so as to remove the plate member outside the vehicle.

Here, when the plate member is approximately closing the storage concave portion, the user cannot reach inside the storage concave portion nor operate the fixed releasing portion disposed on a lower surface side of the plate member. In other words, after the plate member is transferred upward, the lock of the plate member is unlocked.

Therefore, the user can use the plate member for various purposes such as removing the plate member outside the vehicle to use thereof for example as a top panel of a table, other than approximately closing the storage concave portion.

Further, when the storage concave portion is approximately closed, the fixation between the plate member and the plate member frame cannot be unlocked. Thereby, for example by removing the key of the automobile and setting the close locking mechanism impossible to be unlocked, even when the thief smashes or breaks the key of the vehicle and sneaks inside the vehicle, the luggage stored in the storage concave portion can be reliably secured.

In accordance with a third aspect of the present invention, a lifter comprises:

a pair of rail frames which is disposed on the predetermined flat surface and which is approximately in parallel with each other;

a pair of drive links, one end side of the drive links being connected with the rail frame side so as to transfer in the longitudinal direction of the rail frame, the other end side being connected with an approximately horizontal plate member so as to rotate, the drive links being approximately horizontal when the plate member is lowered, and being raised when the plate member is transferred upward; and a pair of driven links, both end sides of the driven links being connected with the plate member side and the predetermined flat surface side, a middle side of the driven links being connected with the drive link so as to rotate, the driven links being approximately horizontal when the plate member is lowered and being raised when the plate member is transferred upward;

wherein the plate member transfers in the longitudinal direction of the rail frame while transferring up and down.

According to the third aspect of the present invention, when each driving and driven links form X-shape, the plate member is transferred upward. When each driving and driven links are in the approximately horizontal state, the plate member is lowered. At this time, the plate member transfers up and down while transferring in the longitudinal direction of the rail frame so as to track or trace an approximately circular trajectory.

Therefore, a transfer flexibility or freedom of the plate member can be enhanced by transferring the plate member not only in the vertical direction but in the horizontal direction. When the plate member tracks the trajectory along the upper portion of space, the lifter is available, for example, even in a narrow space sloped in an upper position such as a loft of a house and a trunk room of a passenger car. Further, for example, when the luggage or the like is transferred between a stepwisely shaped lower and upper horizontal surfaces, the trajectory tracked by the plate member is configured on the basis of the slope angle of the side wall or the like so that the lifter can transfer the luggage even if the side wall between the lower and upper horizontal surfaces is not approximately perpendicular.

Preferably, the lifter has a plurality of sliders guided by the rail frame, the sliders engaging with the drive link side, and a driving mechanism for transferring each slider in the longitudinal direction of the rail frame.

According to the present invention, in addition to the above function, when a driving mechanism is driven so as to transfer each slider in one longitudinal direction of the rail frame, one end side of each drive link is integrally transferred with each slider. Thereby, each driving and driven links are raised so as to lift the plate member. Likewise, when the driving member is driven so as to transfer each slider in the other longitudinal direction of the rail frame, one end side of each drive link is integrally transferred with each slider. Thereby, each driving and driven links are in the approximately horizontal state.

Therefore, the slider transferring along the rail frame transfers other end side of each of the drive links. Thereby, the plate member can be smoothly transferred upwardly and downwardly.

Preferably, a contacting portion capable of contacting with the slider side is formed on the rail frame side of each drive link; the slider comprises: a contacting surface which is sloped upward in a transfer direction of the slider and which contacts with the contacting portion when the drive link is raised from the approximately horizontal state, and a rotary connecting portion capable of connecting with the rail frame side of the drive link so as to rotate, wherein a transfer zone of the slider comprises: an initial transfer zone in which the contacting portion contacts with the contacting surface so as to transmit a driving force of the slider to the drive links; and a normal transfer zone in which the driving force is transmitted from the slider through the rotary connecting portion to the drive links.

According to the present invention, in addition to the above function, when the slider is transferred by driving the driving member when the drive link is approximately horizontal, the slider transfers in the initial transfer zone and the normal transfer zone so as to transfer the plate member to the upper position.

When the slider transfers in the initial transfer zone, the contacting surface of the slider contacts with the contacting portion of the drive link. At this time, the contacting surface of the slider is sloped upward in the transfer direction so as to raise the contacting portion as the slider transfers. When the slider passes the initial transfer zone, the drive link is raised to the predetermined angle.

Further, when the slider transfers in the normal transfer zone, the rotary connecting portion of the slider is connected with the rail frame side of the drive link so as to rotate. Thereby, the rail frame side of the drive link transfers as the slider transfers, and the plate member side of the drive link transfers opposite thereto. Thereby, each drive link and each driven links are raised.

Therefore, in the initial transfer zone, the driving force of the slider can be converted from the approximately horizontal direction to the approximately upper direction so as to be transmitted to the drive link of the approximately horizontal state. At this time, because without using a link mechanism for example, the direct contacting between the drive link and the slider allows the driving force to be transmitted, the space for the link mechanism is not necessary to be secured between the rail frame and the plate member.

Further, when the slider passes the initial transfer zone and the drive link is raised just at the predetermined angle, the rotary connecting portion and the drive link are connected, and the rail frame side of the drive link is transferred with the slider in the approximately horizontal direction. Thereby, the drive link can be raised more.

Preferably, the rotary connecting portion comprises: a groove formed in the slider and extending in the longitudinal direction of the rail frame; and a connecting link, one end side of the connecting link being penetrated by the groove and the other end side is linked on the other end side of the drive link so as to rotate, wherein when the plate member is transferred upward, one end side of the connecting link transfers in the groove as the slider transfers in the initial transfer zone, and one end side of the connecting link positions at the end portion of the groove as the slider transfers in the normal transfer zone.

According to the present invention, in addition to the above function, when the slider transfers in the initial transfer zone as the plate member is transferred upward, one end side of the connecting link transfers in the groove so as not to transmit the driving force of the slider to the connecting link. Further, when the slider passes the initial transfer zone and transfers in the normal transfer zone, one end side of the connecting link positions at the end portion of the groove so as to transmit the driving force of the slider to the connecting link.

Therefore, with a simple structure, because the transmission of driving force from the slider to the connecting link can be converted, the luggage storage structure is quite convenient for the practical use.

Preferably, a pair of sub rails is disposed in parallel with each rail frame, the sub rails guides the vicinity of a portion in an upper part of the rail frame, and the portion connects each drive link with the connecting link.

According to the present invention, in addition to the above function, the sub rail guides the drive link in the vicinity of the portion. Power is transmitted from the slider to the portion connecting with the connecting link. Thereby, driving force can be effectively transmitted from the slider to the drive link.

Further, one end side of the connecting link is connected with the slider guided by the rail frame and the other end side of the connecting link is connected with the drive link in an upper portion of the rail frame. Thereby, the other end side is higher than one end side so that the connecting link is in the sloped state. In other words, even if the plate member is at the approximately lower position and the drive link is in the approximately horizontal state, the angle made by the drive link and the connecting link is relatively large.

Therefore, the driving force is effectively transmitted to the drive link so as to reliably transfer the plate member up and down.

Further, even if the drive link is nearly in the horizontal state, the angle made by the driving and connecting links is relatively large so as to transfer the drive link to the raised state side by a relatively small force.

Preferably, the driving mechanism comprises an electric motor.

According to the present invention, in addition to the function, the slider can be stably transferred by the electric motor so as to smoothly transfer the plate member up and down.

Preferably, two electric motors are disposed, and each slider is independently driven by each electric motor.

According to the present invention, in addition to the above function, each slider is separately controlled so as to reduce the load of one electric motor and increase the luggage capacity of the plate member.

Further, when the luggage is lopsidedly mounted on the plate member, the output torque of each electric motor can be changed on the basis of the weight distribution applied from the plate member to each right or left links.

Preferably, the lifter further comprises: a plate member frame for supporting the plate member, the plate member frame being connected with each driving and driven links, and the plate member frame transferring in the predetermined direction with respect to each driving and driven links; and a driving member for transferring the plate member frame in the predetermined direction.

According to the present invention, in addition to the above function, the driving member is driven so as to transfer the plate member with the plate member frame in the predetermined direction with respect to each driving and driven links.

Therefore, the user can transfer the plate member in consideration of usage or the like. For example, when the lifter is disposed in a narrow space, when the luggage mounted on the plate member is taken out from space, or otherwise when the luggage is mounted on the plate member, the driving member is driven so that the user can transfer the plate member out of the space to handle the luggage.

BRIEF DESCRIPTION OF THE DRAWINGS

The present invention will become more fully and clearly understood from detailed descriptions given hereinbelow and accompanying drawings which are given by way of illustration only, and thus are not intended as a definition of the limits of the present invention, and wherein.

DETAILED DESCRIPTION OF THE PREFERRED EMBODIMENTS

First Embodiment

Figure 1:
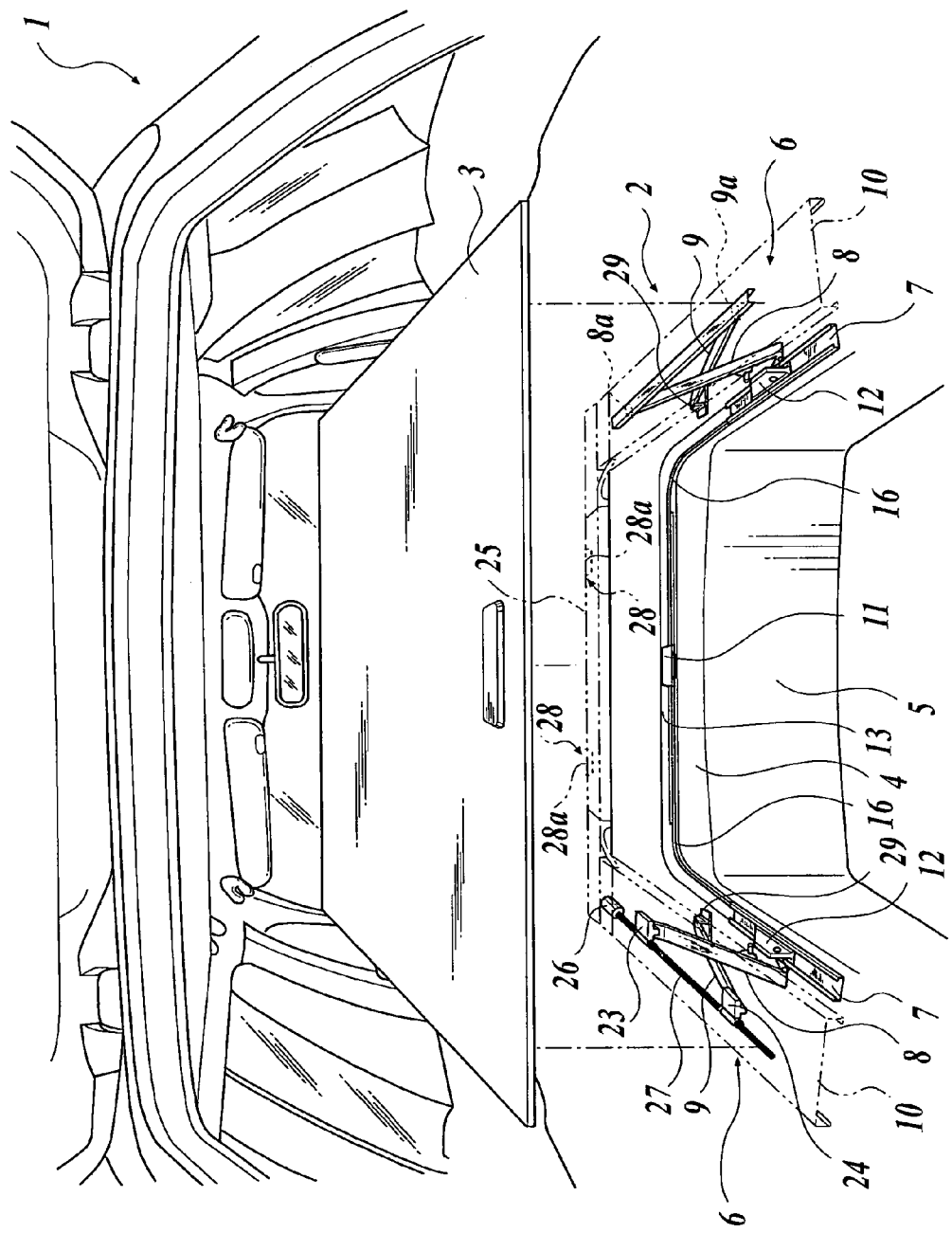
FIG. 1 is an outside perspective view in a vehicle and a lifter according to the first embodiment.
Figure 2:
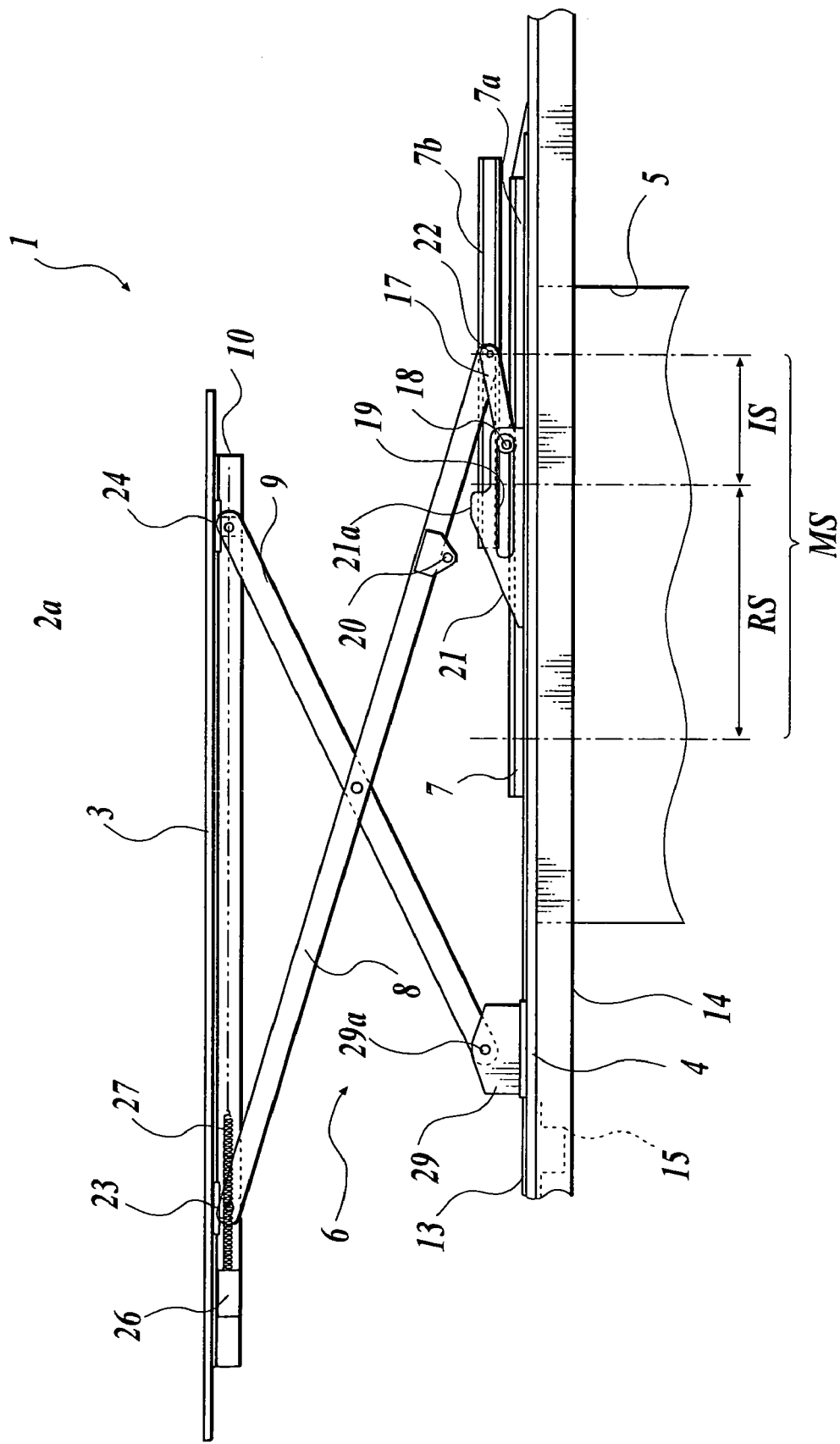
FIG. 2 is a schematic side view of a luggage storage structure for the vehicle and the lifter.
Figure 3:
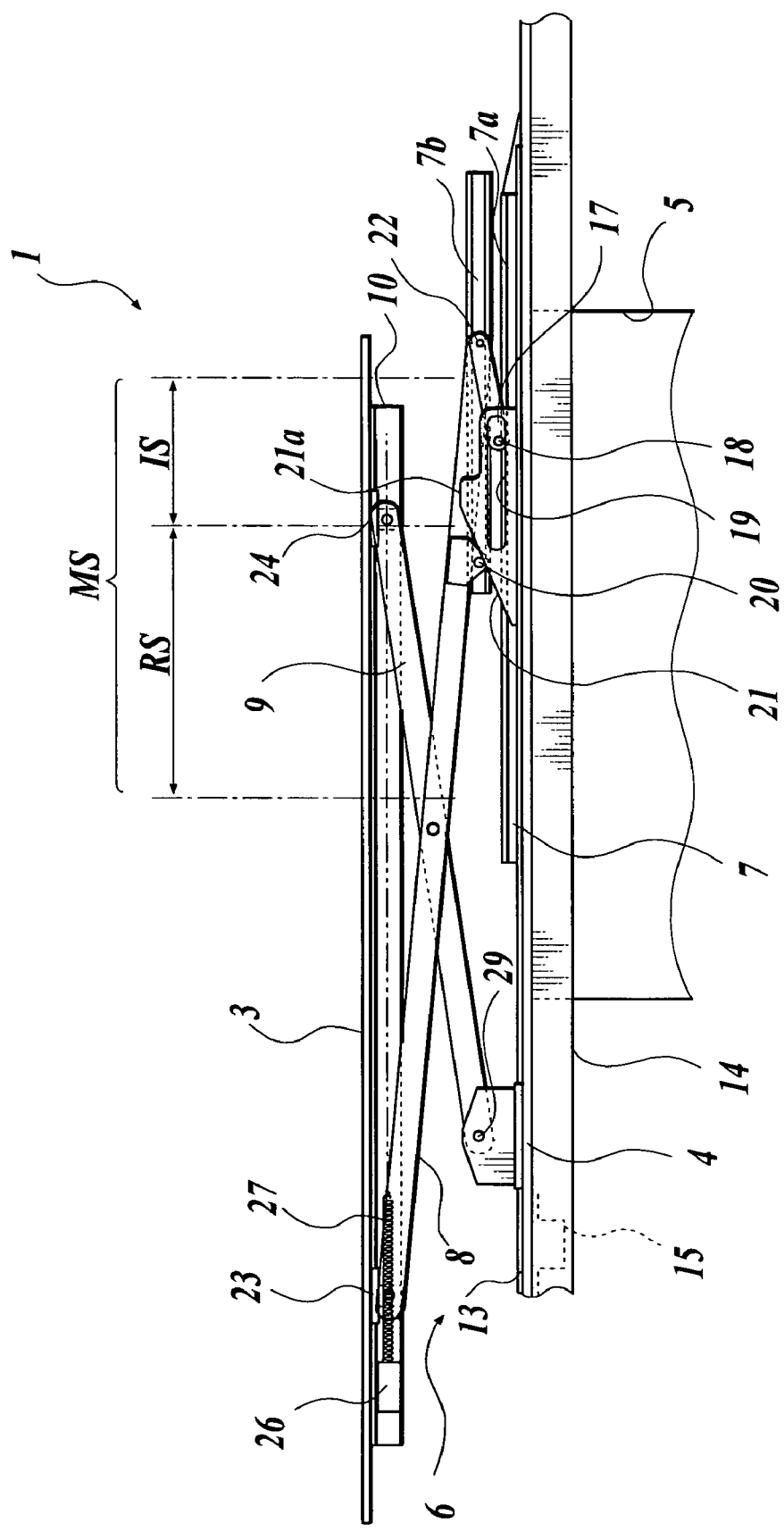
FIG. 3 is a schematic side view of the luggage storage structure therefor when a plate member is a little lefted.
Figure 4:
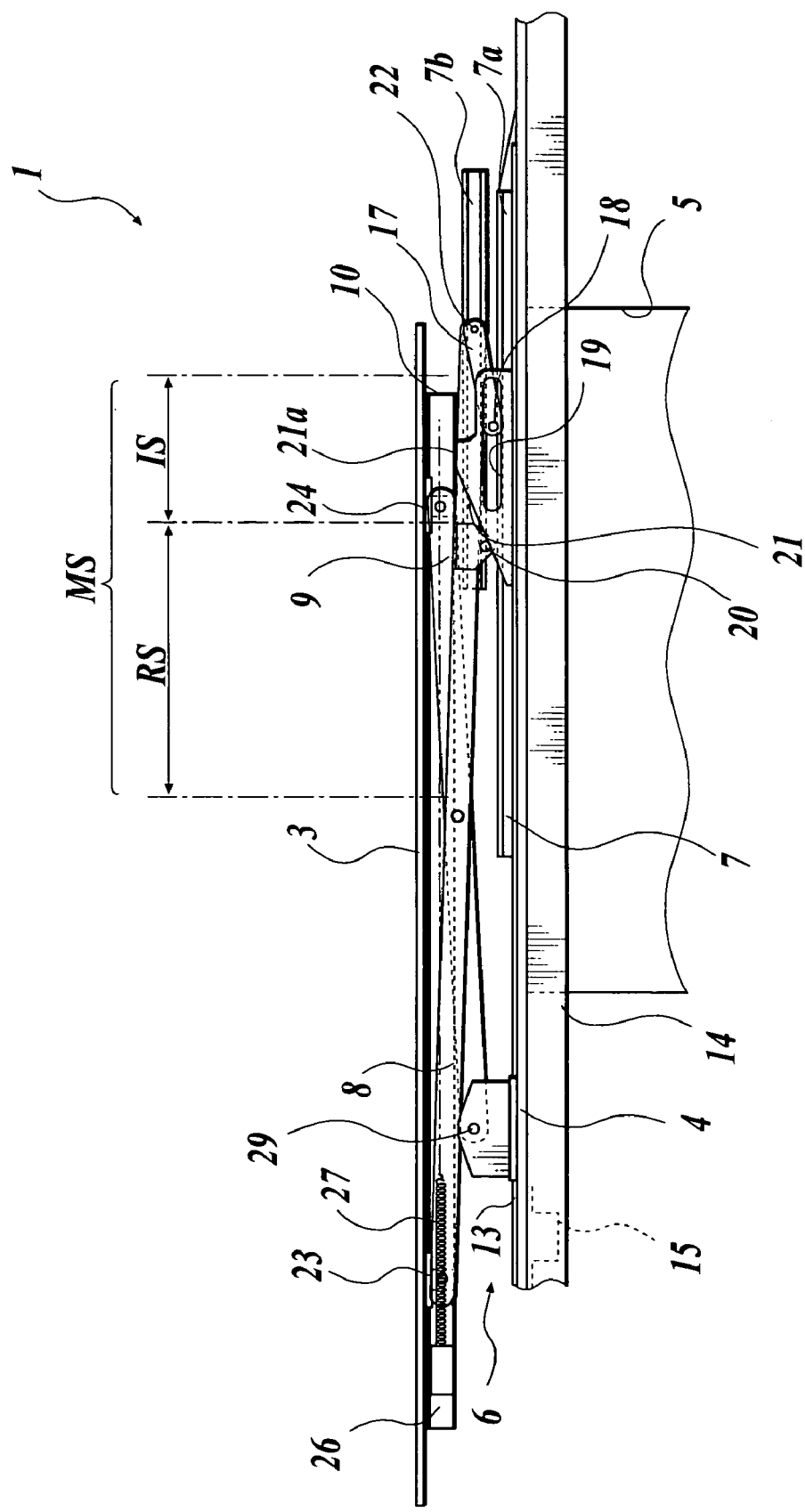
FIG. 4 is the schematic side view of the luggage storage structure therefor when the plate is folded down.
Figure 5:
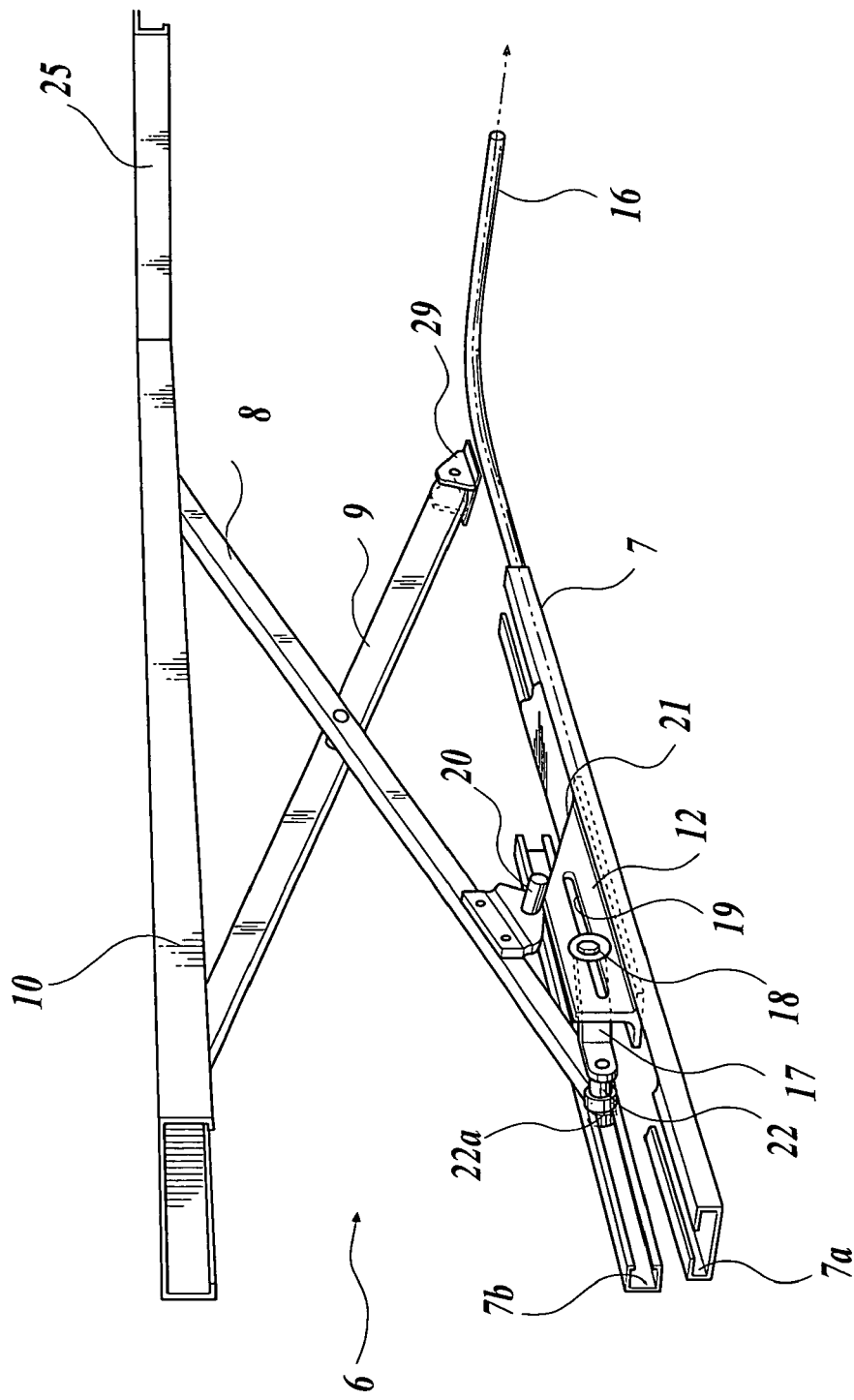
FIG. 5 is a partially outside explanatory view of the luggage storage structure.
Figure 6:
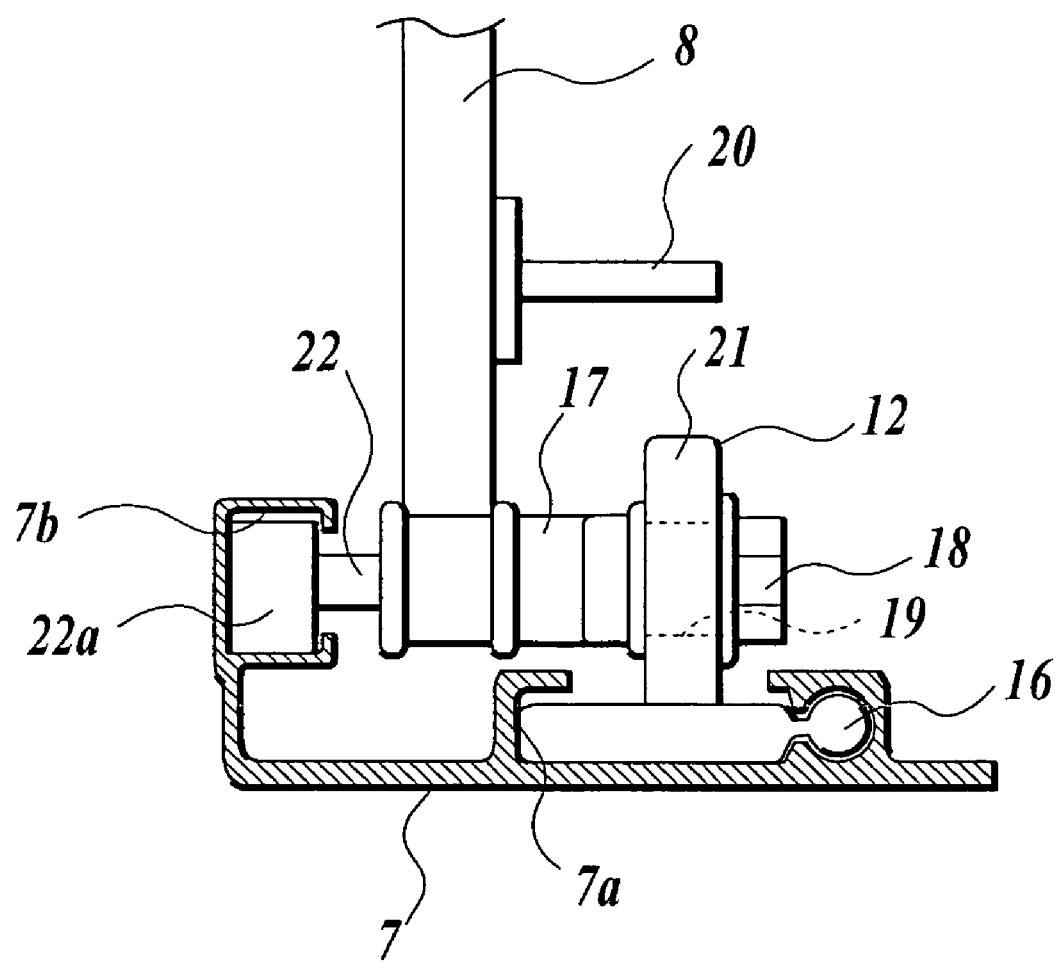
FIG. 6 is a front sectional view of a rail frame.
Figure 7:
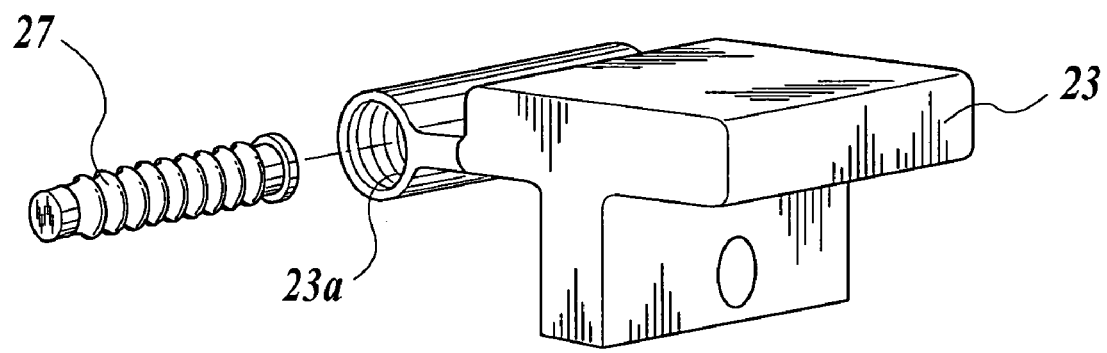
FIG. 7 is an exploded perspective view of a slider.
Figure 8:
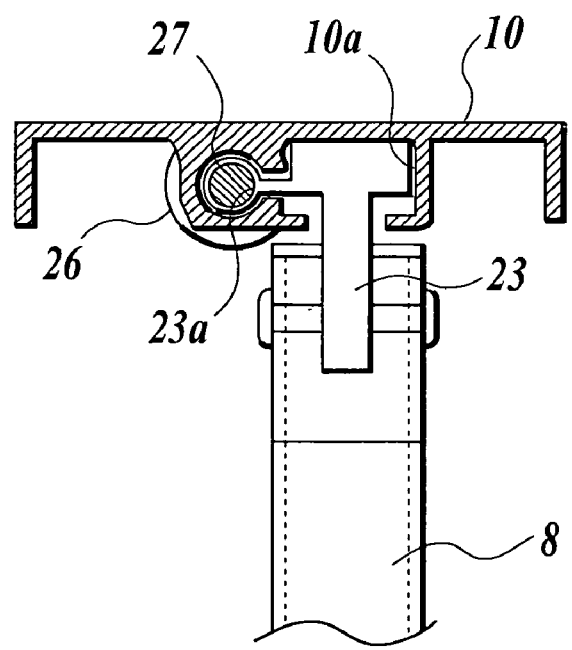
FIG. 8 is the front sectional view of a plate member frame.
Figure 9:
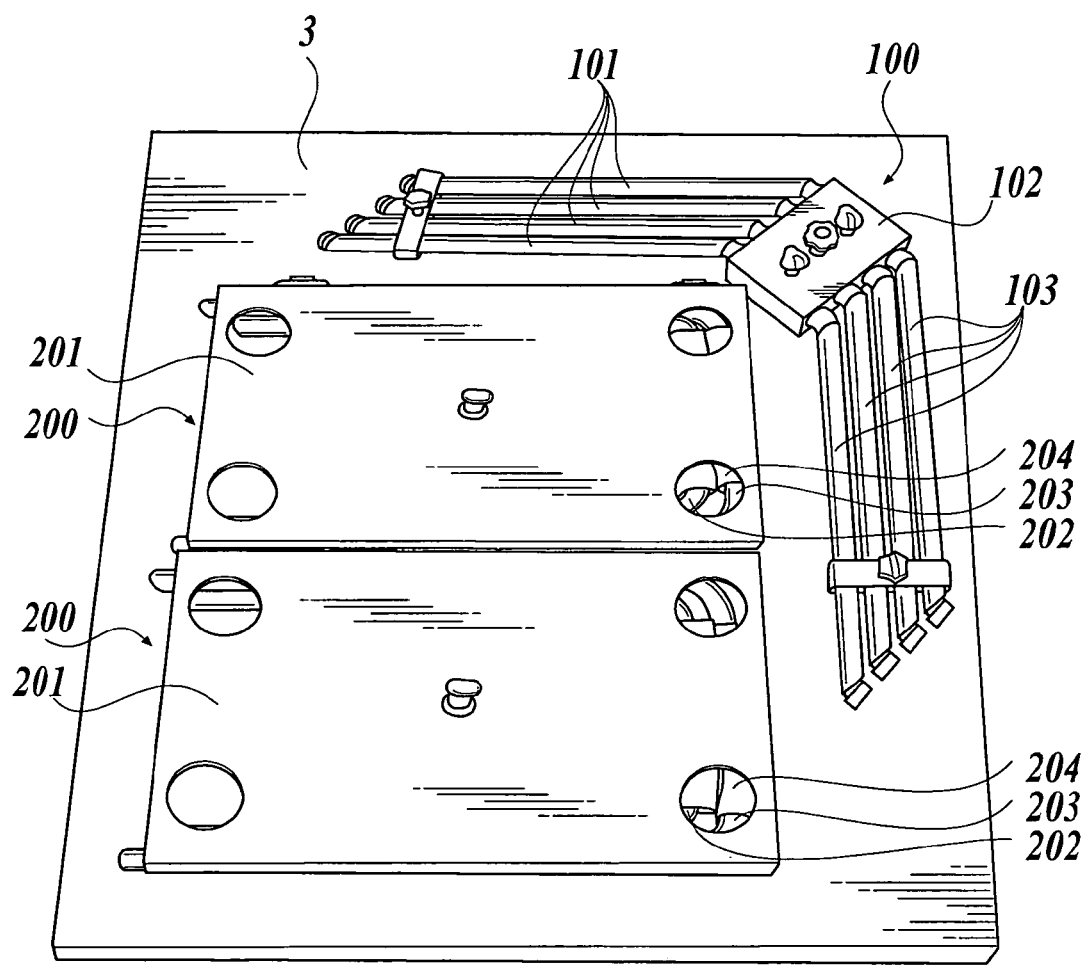
FIG. 9 is a perspective view showing a lower surface of the plate member.
Figure 10:
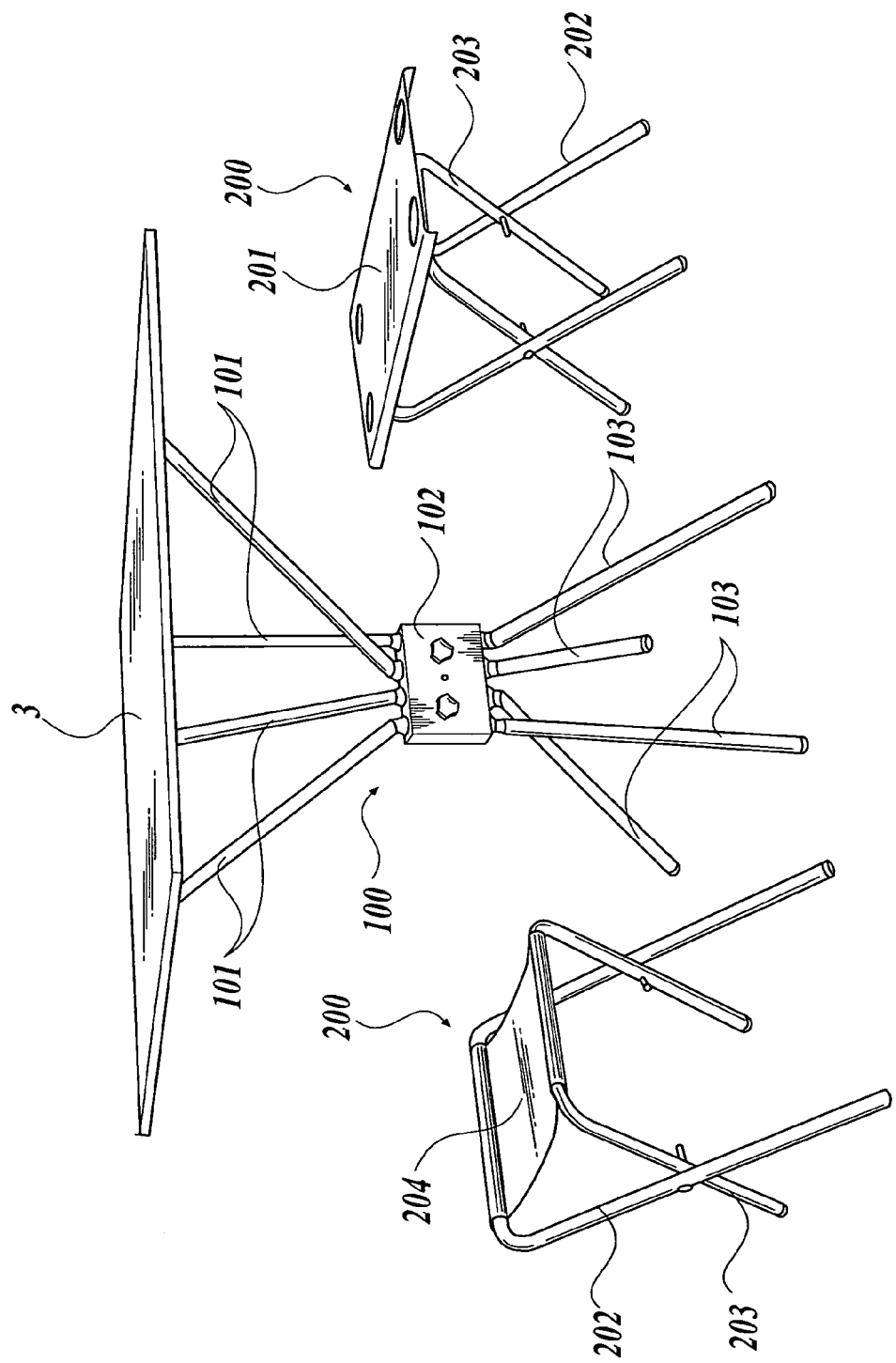
FIG. 10 is an outside perspective view showing a table for supporting the plate member by a leg device for a table and a folding chair raised.

FIGS. 1 to 10 show one embodiment of the present invention. FIG. 1 is perspective view of an inside of a vehicle and a lifter. FIG. 2 is a schematic side view of a luggage storage structure and the lifter of an automobile. FIG. 3 is the schematic side view of the luggage storage structure and the lifter of the automobile. FIG. 4 is the schematic side view of the luggage storage structure and the lifter of the automobile. FIG. 5 is a partially outside explanatory view of the luggage storage structure and the lifter of the automobile. FIG. 6 is a front sectional view of a rail frame. FIG. 7 is an exploded perspective view of a slider. FIG. 8 is the front sectional view of a plate member frame. FIG. 9 is the perspective view showing a lower surface of a plate member. FIG. 10 is an outside perspective view showing a table for supporting a plate member by a leg device for the table and a folding chair that is raised.

As shown in FIG. 1, the luggage storage structure and the lifter 2 of the automobile can transfer up and down a plate member 3 disposed in a luggage space 2a of the vehicle 1. The lifter 2 is not limited to the embodiment in which the lifter 2 is disposed in the vehicle 1. An embodiment is just one of various embodiments of the lifter 2. The plate member 3 approximately closes an upper part of a storage concave portion 5. The storage concave portion 5 is formed so as to project downward on a floor panel 4 of the vehicle 1. In other words, the plate member 3 is a bottom of the luggage space 2a when lowered. The plate member 3 opens the storage concave portion 5 while separating the luggage space 2a into an upper portion and a lower portion when raised. In the embodiment, the vehicle 1 is a wagon type having the luggage space 2a rearward. The storage concave portion 5 is a spare-tire storage portion formed in the floor panel 4. In other words, a luggage is stored in the upper portion of the spare tire stored in a spare tire storage portion.

As shown in FIG. 1, the plate member 3 is formed as an approximately quadrangle and supported by a transfer mechanism 6 so as to transfer up and down. The transfer mechanism 6 is disposed in the floor panel 4. As shown in FIG. 1, the transfer mechanism 6 has a pair of rail frames 7, a drive link 8 and a driven link 9. A pair of the rail frames 7 are fixed on the floor panel 4 side in parallel with each other. Each end of the drive link 8 and the driven link 9 is connected with the rail frame 7 side. The drive link 8 and the driven link 9 forms approximately an X-shape when the plate member 3 is transferred upward. In the embodiment, as shown in FIG. 1, the plate member frame 10 is disposed on a lower surface of the plate member 3. The other end side of each drive link 8 and each driven link 9 are respectively connected with the plate member frame 10. Each drive link 8 is connected with a lower slider 12 transferred along each rail frame 7 driven by a first electric motor 11.

In the embodiment, the drive link 8 and the driven link 9 are formed as a different length each other. The drive link 8 and the driven link 9 engage at an approximately middle position thereof so as to rotate each other. As a result, the plate member 3 transfers in a longitudinal direction in forward and rearward directions of the rail frame 7 while transferring up and down.

As shown in FIG. 1, each rail frame 7 extends forwardly and backwardly along the vehicle 1. A link member 13 extending in the horizontal direction links a front end side thereof. In the embodiment, each rail frame 7 and the link member 13 are respectively fixed outside of the storage concave portion 5 of the floor panel 4. As shown in FIGS. 2 to 4, each rail frame 7 is fixed along a rear side member 14 disposed on a lower surface of the floor panel 4. The link member 13 is fixed along a rear cross member 15 disposed on the lower surface of the floor panel 4.

A schematic structure of the luggage storage structure for the automobile and the lifter 2 was described as above. Hereinafter, the structure of the luggage storage structure and the lifter 2 are described in further details.

As shown in FIG. 1, the first electric motor 11 is connected with a lower slider 12 through a wire 16. One electric motor 11 disposed in the embodiment drives two lower sliders 12. The wire 16 is a conventional push-pull type of the wire 16. As shown in FIGS. 5 and 6, the wire 16 is connected with the inside of the right and left lower sliders 12. In other words, in the embodiment, the first electric motor 11 and the wire 16 are a driving mechanism. Further, in the embodiment, as shown in FIG. 1, the first electric motor 11 is disposed in the middle position of right and left link members 13.

As shown in FIG. 6, the lower slider 12 extends back and forth. The lower slider 12 is formed as approximately T-shape if seen from front. A lower position of the lower slider 12 is guided back and forth by a main rail 7a formed in the rail frame 7. The lower slider 12 is connected with one end side of the drive link 8 through an connecting link 17. A slide pin 18 extending right and left is disposed in the lower slider 12 side of the connecting link 17. A transfer guide groove 19 extending in a lengthwise direction of the vehicle 1 and penetrating the slide pin 18 is formed in the lower slider 12. Further, a contacting surface 21 is formed in an upper portion of the lower slider 12. The contacting surface 21 upwardly slopes to the rearward of the vehicle 1 and contacts with a contacting portion 20 formed in the drive link 8.

As shown in FIGS. 2 to 4, the connecting link 17 extending approximately in the lengthwise direction of the vehicle 1 is connected through a pivotal support pin 22 extending in a widthwise direction of the vehicle 1 to one end side of the drive link 8 so as to rotate. As shown in FIG. 6, an approximately uprighted rail engage portion 22a is formed in the outside of the right and left pivotal support pin 22. The rail engage portion 22a is guided in the lengthwise direction of the vehicle 1 by a sub rail 7b formed in the rail frame 7. Further, the rail engage portion 22a is disposed in parallel with each rail frame 7. The rail engage portion 22a is guided in the longitudinal direction of the rail frame 7 by a right and left pair of sub rails 7b disposed in an upper portion of the rail frame 7. In other words, the sub rail 7b guides in the lengthwise direction of the vehicle 1 in the vicinity of a connecting portion. The portion is connected with the connecting link 17 in each drive link 8 through the rail engage portion 22a. In the embodiment, the connecting link 17 is connected with the lower slider 12 and the drive link 8 when the connecting link 17 is upwardly sloped to the rearward of the vehicle 1. In other words, the lower slider 12 engages with the connecting link 17 of the drive link 8 side. Further, the sub rail 7b is integrally formed with the rail frame 7. Further, in the embodiment, one end side of the connecting link 17 is connected with the lower slider 12 guided by the rail frame 7. The other end side is connected with the drive link 8 in an upper portion of the rail frame 7. Thereby, the other end side is at the higher position than that of one end side, and as shown in FIGS. 2 to 4, the connecting link 17 is in the sloped state. In other words, even if the plate member 3 is relatively in a lower position while the drive link 8 is nearly in the horizontal state, the angle of the drive link 8 and the connecting link 17 is relatively large.

The one end side of the drive link 8 is connected with the side of the rail frame 7 so as to transfer in the longitudinal direction of the rail frame 7. Further, the drive link 8 is connected with the side of the plate member 3 so as to transfer in the lengthwise direction of the vehicle 1. In the embodiment, a first upper slider 23 can transfer in the lengthwise direction of the vehicle 1 by a rail portion 10a of the plate member frame 10. The first upper slider 23 is connected with the other end side of the drive link 8 so as to rotate.

As described above, one end side of the drive link 8 can rotate with respect to the connecting link 17 by the pivotal support pin 22. In the embodiment, the connecting link 17, the slide pin 18, the transfer guide groove 19 and the pivotal support pin 22 are a rotary connecting portion. Further, as shown in FIG. 2, predetermined interval is provided on the other end side than the pivotal support pin 22 so as to form a contacting portion 20 contacting with a contacting surface 21 of the lower slider 12. In the embodiment, the contacting portion 20 is a pin-shaped member projected on the drive link 8. The drive link 8 and the driven link 9 are connected on the middle position therebetween so as to rotate. As shown in FIG. 4, the drive link 8 is approximately horizontal when the plate member 3 closes the storage concave portion 5. The drive link 8 is raised when the plate member 3 transfers upward. In other words, one end side of each drive link 8 transfers along the rail frame 7 so as to shift each drive link 8 and each driven link 9 between the approximately horizontal state and the raised state. Further, in the embodiment, the rotary connecting portion has a transfer guide groove 19 extending in the longitudinal direction of the rail frame 7 and formed in the lower slider 12, and the connecting link 17 in which the slide pin 18 disposed on one end side is penetrated by the transfer guide groove 19 and the ether end side is connected with the other end side of the drive link 8 so as to rotate. Therefore, as shown in FIGS. 2 to 4, the slope angle of the connecting link 17 is constant in the embodiment.

Here, a transfer zone MS of the lower slider 12, as shown in FIGS. 2 to 4, includes an initial transfer zone IS in which the contacting surface 21 contacts with the contacting portion 20 so as to transmit a driving force of the lower slider 12 to the drive link 8, and a normal transfer zone RS in which the driving force is transmitted from the lower slider 12 through the connecting link 17, the slide pin 18 and the pivotal support pin 22 to the drive link 8. Therefore, in FIGS. 2 to 4, each MS, IS and RS zone is shown on the basis of an upper end portion 21a of the contacting surface 21 of the slider 12. In the embodiment, when the lower slider 12 transfers from the rearward to the forward of the rail frame 7, the drive link 8 is raised. In other words, the initial transfer zone IS and the normal transfer zone RS are arranged from the rearward to the forward of the rail frame 7.

Here, when the plate member 3 is transferred upward, the above described rotary connecting portion is so structured that the slide pin 18 forming one end side of the connecting link 17 transfers in the groove 19 as the lower slider 12 transfers in the initial transfer zone IS, and one end side of the connecting link 17 positions at the end portion of the groove 19 as the lower slider 12 transfers in the normal transfer zone RS. Thereby, when the plate member 3 is transferred upward, because one end side of the connecting link 17 transfers in the transfer guide groove 19 when the lower slider 12 transfers in the initial transfer zone IS, the driving force of the lower slider 12 is not transmitted to the connecting link 17. Further, because one end side of the connecting link 17 positions to the rearward of the transfer guide groove 19 when the lower slider 12 passes the initial transfer zone IS and then transfers in the normal transfer zone RS, the driving force of the lower slider 12 is transmitted to the connecting link 17.

The driven link 9 is connected with the floor panel 4 side and the plate member frame 10 so as to rotate. In the embodiment, one end side of the driven link 9 is connected with a pivotal support member 29 so as to rotate. The pivotal support member fixed to the floor panel 4. Further, the other end side of the driven link 9 is so connected as to transfer in the lengthwise direction of the vehicle 1 with respect to the plate member frame 10. Here, the other end side of the driven link 9 is connected with a second upper slider 24 so as to rotate. The second upper slider 24 can transfer back and forth by the rail portion 10a of the plate member frame 10. The driven link 9 as well as the drive link 8 is approximately horizontal when the plate member 3 closes the storage concave portion 5. The driven link 9 is raised when the plate member 3 transfers upward.

In the embodiment, as shown in FIG. 1, the plate member frame 10 extends back and forth. The plate member frame 10 as well as the rail frame 7 is disposed on both right and left sides. A stiffening member 25 in which one end side thereof is extending approximately right and left is disposed in an upper portion of each rail frame 7 and links each plate member frame 10.

As shown in FIGS. 2 to 4, a second electric motor 26 for transferring the first upper slider 23 along the rail portion 10a is disposed on the front lower side of the plate member frame 10. The second electric motor 26 is connected with a worm gear 27 extending approximately in the lengthwise direction of the vehicle 1. In the embodiment, the second electric motor 26 and the worm gear 27 are a drive member. As shown in FIG. 7 and 8, a screw hole 23a for screwing on the worm gear 27 is formed in the first upper slider 23. The screw hole 23a extending approximately in the lengthwise direction of the vehicle 1 forms a female screw portion on the inner surface. Here, a penetrating hole for penetrating the worm gear 27 is formed in the second upper slider 24.

Further, in the embodiment, the second electric motor 26 and the worm gear 27 are disposed on one side of the plate member frame 10. As shown in FIG. 1, the drive link 8 and the driven link 9 connected with the other side of the plate member frame 10 have rollers 8a and 9a capable of rotating and transferring in the lengthwise direction of the vehicle 1.

In the embodiment, as shown in FIG. 1, the plate member 3 and the plate member frame 10 are locked by a lock mechanism 28 disposed in the stiffening member 25. The lock of the lock mechanism 28 can be unlocked by a release portion 28a disposed on a lower surface of the plate member 3. Here, because the lock mechanism 28 is structured as well as conventional one, it is not herein described.

In the embodiment, as shown in FIG. 9, a leg for a table 100 is disposed on the lower surface of the plate member 3. The leg for the table 100 provides an approximately horizontal support for the plate member 3. In other words, the table can be set up by using the plate member 3 as a top plate for the table and the leg for the table 100 as the leg for the table 100. The leg for the table 100 has a plurality of upper legs 101 for supporting the plate member 3, a link 102 connected with the upper leg 101 so as to rotate, and a plurality of lower legs 103 for supporting the link 102 so as to rotate. As shown in FIG. 10, each upper leg 101 and each lower leg 103 sloped to rotate around the vertical direction with respect to the vertical direction as a center axis at the portion connected with the link 102. In other words, each lower leg 103 is rotated and transferred so as to choose a ground position of each lower leg 103. It is also applicable for an irregularity of a ground or the like.

Further, a folding chair 200 other than the leg device for the table 100 is fixed to the lower surface of the plate member 3. The folding chair 200 has a washer plate 201 fixed to the plate member 3 by screw or the like, and an approximately horseshoe-shaped front leg portion 202 and a rear leg portion 203 latched by the washer plate 201. The front leg portion 202 and the rear leg portion 203 are linked so as to rotate each other so that they are approximately overlapped each other in the folded state. Thereby, they are stored in the sitting plate 201.

The front leg portion 202 and the rear leg portion 203 of the folded state can be rotated so as to unfold and then capable of being raised. In the front leg portion 202 and the rear leg portion 203, an extendable remittent member 204 is bridged. The remittent member 204 is extended when the front leg portion 202 and the rear leg portion 203 are raised. Thereby, a passenger or the like can sit on the remittent member 204. Here, the washer plate 201 can be latched in the top end of the front leg portion 202 and the rear leg portion 203 which are raised. Thereby, the passenger or the like can choose to sit on the remittent member 204 or sit on the washer plate 201.

In the luggage storage structure for the automobile and the lifter 2 structured as above, the passenger or the like of the automobile uses the plate member 3 as the bottom plate for the luggage space when the vehicle is driven. As shown in FIG. 10, when the passenger gets off the vehicle 1 at a destination, he can unfold the leg device for the table 100 and the folding chair 200 to use thereof as the table and a chair.

In the embodiment, the plate member 3 is fixed to each drive link 8 and each driven link 9 through the plate member frame 10. In other words, the passenger or the like can unlock the lock by using the release portion 28a so as to unlock the plate member 3 fixed to the plate member frame 10. Thereby he can remove the plate member 3 out of the vehicle side.

At this time, when the plate member 3 approximately closes the storage concave portion 5, the passenger or the like cannot reach his or her hand inside the storage concave portion 5 to operate the release portion 28a disposed on a lower surface side of the plate member 3. In other words, when the plate member 3 is transferred upward, the plate member 3 is unlocked.

In the embodiment, when the table and the chair are not used, the plate member 3 can be used as a bottom plate for the luggage space of the automobile. At this time, because the leg device for the table 100 and the folding chair 200 are fixed to a lower surface of the plate member 3 that is approximately horizontal, the space covered by the plate member 3 does not make the luggage space narrow and the relatively large luggage space is secured.

Here, in accordance with the luggage storage structure and the lifter 2, the following will describe the way the plate member 3 moves when the plate member 3 is transferred vertically.

When the lower slider 12 positions at the rearward of the rail frame 7, the plate member 3 is in a lower position while the drive link 8 and the driven link 9 are approximately horizontal. Under the condition, when the first electric motor 11 is driven to transfer the lower slider 12 forward through the wire 16, the lower slider 12 transfers in the initial transfer zone IS and the normal transfer zone RS. Thereby, the plate member 3 transfers to the raised position.

When the top end portion 21a of the contacting surface 21 of the lower slider 12 transfers in the initial transfer zone IS, the contacting surface 21 of the lower slider 12 connects with the contacting portion 20 of the drive link 8. At this time, the contacting surface 21 of the lower slider 12 upwardly slopes to the rearward so as to transfer the contacting portion 20 upward as the lower slider 12 transfers forward. When the top end portion 21a passes the initial transfer zone IS, the drive link 8 is raised at the predetermined angle. Here, at this time, the slide pin 18 connected with the connecting link 17 transfers comparatively rearward in the transfer guide groove 19 of the lower slider 12. Here, because the sub rail 7b guides the drive link 8 in the vicinity of the portion connected with the connecting link 17 to which the power of the lower slider 12 is transmitted, the driving force of the lower slider 12 can be effectively transmitted to the drive link.

Further, when the top end portion 21a approaches the normal transfer zone RS, the slide pin 18 contacts with the back end of the transfer guide groove 19. In other words, under the condition, when the slider 12 transfers forward, the lower slider 12 and the side of the rail frame 7 of the drive link 8 integrally transfer forward. In other words, the lower slider 12 and the rail frame 7 side of the drive link 8 are connected by the connecting link 17, the slide pin 18 and the pivotal support pin 22 so as to rotate. Thereby, the side of the rail frame 7 of the drive link 8 transfers as the lower slider 12 transfers. At this time, the plate member 3 side of the driven link 9 transfers in the same direction as the rail frame 7 side. Each drive link 8 and each driven link 9 are raised so as to form the approximately X-shape. And then, the transfer of the plate member 3 to the raised position is finished. In the embodiment, as shown in FIGS. 2 to 4, although the plate member 3 transfers up and down while transferring in the longitudinal direction of the rail frame 7, the plate member 3 transfers in the way of tracking an approximately circular trajectory. Further, when the first electric motor 11 stops in the normal transfer zone RS, the lower slider 12 and the drive link 8 are locked. Thereby, the plate member 3 is locked. In other words, the plate member 3 can be locked at a desired height. In the embodiment, as shown in FIGS. 2 to 4, because the plate member 3 transfers up and down while transferring in the longitudinal direction of the rail frame 7, the plate member 3 transfers in the way of tracking the approximately circular trajectory. Further, when the first electric motor 11 stops in the normal transfer zone RS, the lower slider 12 and the drive link 8 are locked. Thereby, the plate member 3 is locked. In other words, the plate member 3 can be locked at the desired height.

Likewise, when the first electric motor 11 is driven and the lower slider 12 is transferred to the rearward of the rail frame 7, the rail frame 7 side of the drive link 8 transfers with the lower slider 12. At this time, the plate member 3 side of the driven link 9 transfers in the same direction. Each drive link 8 and each driven link 9 are approximately horizontal. And then, the transfer of the plate member 3 to the closed position for the storage concave portion 5 is finished.

Further, in the embodiment, the second electric motor 26 is driven so as to transfer the plate member 3 in the lengthwise direction of the vehicle 1 with respect to each link 8 and 9. In other words, when the second electric motor 26 is driven, the worm gear 27 rotates. The first upper slider 23 screwing on the worm gear 27 is comparatively guided by the rail portion 10a. As a result, the plate member frame 10 and the plate member 3 transfer in the lengthwise direction of the vehicle 1 with respect to the first upper slider 23 linked by the drive link 8. At this time, because the second upper slider 24 is not engaged with the worm gear 27, the second upper slider 24 follows the first upper slider 23 so as to transfer in the lengthwise direction of the vehicle 1.

Therefore, according to the luggage storage structure for the automobile of the embodiment, the luggage stored in the storage concave portion 5 cannot be removed because the plate member 3 closes the storage concave portion 5. In other words, in case the thief or the like smashes the key hole of the vehicle 1 to intrude into the vehicle 1 for example, the luggage can be securely protected. Further, because the plate member 3 approximately completely covers the luggage, the luggage inside the vehicle can be kept secret.

Further, according to the luggage storage structure for the automobile of the embodiment, the luggage can be stored by using the usual spare tire storage portion formed in the floor panel 4. Further, by transferring the plate member 3 upward, the luggage can be mounted on both of the floor panel 4 side and the plate member 3. Because the luggage capacity of the luggage space 2 is increased, it is quite convenient for the practical use.

Therefore, according to the luggage storage structure for the automobile of the embodiment, because one end side of each drive link 8 transfers in the longitudinal direction of the rail frame 7 so as to transfer the plate member 3 up and down, the plate member 3 can be smoothly transferred up and down. Further, two links of each drive link 8 and each driven link 9 can support the plate member 3 so as to stably support the plate member 3.

Further, according to the luggage storage structure for the automobile of the embodiment, in the initial transfer zone IS, the driving force of the lower slider 12 can be converted from the approximately horizontal direction to the approximately upper direction so as to be transmitted to the drive link 8 which is approximately horizontal. At this time, because without using a link mechanism or the like for example, the direct contact between the drive link 8 and the lower slider 12 allows the driving force to be transmitted, the space for the link mechanism or the like is not necessary to be secured between the rail frame 7 and the plate member 3.

Further, when the lower slider 12 passes the initial transfer zone IS and the drive link 8 is raised just at the predetermined angle, the lower slider 12 and the drive link 8 are connected, and the rail frame 7 side of the drive link 8 is transferred with the lower slider 12 in the approximately horizontal direction. Thereby, the drive link 8 can be raised more higher.

Further, according to the luggage storage structure for the automobile of the embodiment, the driving force of the lower slider 12 is transmitted to the drive link 8 side through the connecting link 17 extending approximately in the lengthwise direction of the vehicle 1. Thereby, one end side of the drive link 8 can be disposed more rearwardly. Thereby, the drive link 8 is structured longer so as to make the vertical stroke of the plate member 3 larger. Further, the sub rail 7b of the rail frame 7 guides the pivotal support pin 22 so as to stably transfer the drive link 8.

Further, according to the luggage storage structure for the automobile of the embodiment, the lower slider 12 is stably transferred by the first electric motor 11 so as to smoothly transfer the plate member 3 up and down. Further, the first electric motor 11 is stopped so as to lock the plate member 3. In other words, when the luggage is protruded from the storage concave portion 5, the first electric motor 11 may be so driven that the plate member 3 is lowered and contacts with the upper portion of the luggage, and when the predetermined force is applied from the plate member 3 to the luggage, the first electric motor 11 is stopped so as to fix the luggage.

Further, according to the luggage storage structure for the automobile of the embodiment, by driving the second electric motor 26, the plate member 3 can be transferred in the lengthwise direction of the vehicle 1 with respect to each drive link 8 and each driven link 9. Thereby, the passenger or the like can transfer the plate member 3 in accordance with usages or the like. In the embodiment, when the luggage mounted on the plate member 3 is taken out from the vehicle 1 or when the luggage taken out from the vehicle 1 is mounted on the plate member 3, the passenger or the like can drive the second electric motor 26 so as to transfer the plate member in front of him or her (for example, backdoor side) to handle the luggage.

Further, according to the luggage storage structure for the automobile of the embodiment, the plate member 3 is disposed on the plate member frame 10 so as to be removed. Thereby, the passenger or the like can use the plate member 3 not only for approximately closing the storage concave portion 5 but also for removing the plate member 3 out of the vehicle 1 side to use as a top panel of the table outside the vehicle 1.

Further, when the storage concave portion 5 is approximately closed, the fixation between the plate member 3 and the plate member frame 10 cannot be unlocked. Thereby, for example, when the key of the automobile is removed and the first electric motor 11 is not supplied with power by the battery, in case the thief or the like smashes the key hole to the vehicle 1 to intrude into the vehicle 1, luggage can be securely protected in the storage concave portion 5.

Further, according to the luggage storage structure for the automobile of the embodiment, because each rail frame 7 is disposed along the rear side member 14 of vehicle 1, the load applied by each link 8 and 9 effects the rear side member 14 so as to prevent the floor panel 4 from deformation. Thereby, the luggage capacity of the plate member 3 effectively increases. Further, because the link member 13 is disposed along the rear cross member 15, the deformation of the floor panel 4 can be prevented and more large amount of the luggage can be mounted on the plate member 3.

Therefore, according to the lifter 2 of the embodiment, because the plate member 3 transfers in the lengthwise direction of the vehicle 1 while transferring up and down, the plate member 3 can be transferred not only up and down but in the horizontal direction so as to enhance transfer flexibility of the plate member 3. In other words, for example, in narrow space such as the loft of the house and the trunk room of the car that is sloped in an upper position, the lifter 2 can be disposed by approximately coinciding with a transfer trajectory of the plate member 3 along an upper portion of the space. Further, for example, in case the luggage or the like is transferred between the stepwisely-shaped lower horizontal surface and the stepwisely-shaped upper horizontal surface, even if the side wall between the lower horizontal surface and the upper horizontal surface is not approximately perpendicular, the luggage or the like can be transferred by the lifter 2 by configuring the transfer trajectory of the plate member on the basis of the slope angle of the side wall or the like.

Further, according to the lifter 2 of the embodiment, the lower slider 12 transferring along the rail frame 7 transfers one end side of each drive link 8 so as to smoothly transfer the plate member 3 up and down.

Further, according to the lifter 2 of the embodiment, in the initial transfer zone IS, the driving force of the lower slider 12 can be converted from the approximately horizontal direction to the approximately upper direction so as to be transmitted to the drive link 8 which is approximately horizontal. At this time, because without using, for example, a link mechanism or the like, the direct contact between the drive link 8 and the lower slider 12 allows the driving force to be transmitted, the space for the link mechanism or the like is not necessary to be secured between the rail frame 7 and the plate member 3.

Further, when the lower slider 12 passes the initial transfer zone IS and the drive link 8 is raised at the predetermined angle, the lower slider 12 and the drive link 8 are connected so as to rotate. Thereby, the rail frame 7 side of the drive link 8 and the lower slider 12 are transferred in the approximately horizontal direction and the drive link 8 can be raised more higher.

Further, according to the lifter 2 of the embodiment, the slide pin 18 of one end side of the connecting link 17 is penetrated in the transfer guide groove 19 formed in the lower slider 12, and thereby with a simple structure, because the transmission of the driving force from the lower slider 12 to the connecting link 17 can be converted, the luggage storage structure is quite convenient for the practical use.

Because the drive link 8 is guided by the sub rail 7b in the vicinity of the portion connected with the connecting link 17 to which the power of the lower slider 12 is transmitted, the driving force of the lower slider 12 can be effectively transmitted to the drive link 8 so as to precisely transfer the plate member 3 up and down.

Further, even if the drive link 8 is approximately horizontal, the angle of the drive link 8 and the connecting link 17 is approximately large so as to transfer the drive link 8 to the raised state side by using relatively small power.

Further, according to the lifter 2 of the embodiment, the lower slider 12 is stably transferred by the first electric motor 11 so as to smoothly transfer the plate member 3 up and down. Further, the first electric motor 11 is stopped so as to lock the plate member 3.

Further, according to the lifter 2 of the embodiment, the plate member 3 can transfer in the lengthwise direction of the vehicle 1 with respect to each drive link 8 and each driven link 9 by driving the second electric motor 26. Thereby, the user of the lifter or the like can transfer the plate member 3 in accordance with the usage or the like. In the embodiment, when the luggage mounted on the plate member 3 is taken out from the vehicle 1 and when the luggage taken inside the vehicle 1 is mounted on the plate member 3, the user of the lifter or the like can take the luggage by driving the second electric motor 26 so as to transfer the plate member 3 to an user side (for example, backdoor side).

Further, according to the lifter 2 of the embodiment, the driving force of the lower slider 12 is transmitted to the drive link 8 side through the connecting link 17 extending approximately in the lengthwise direction of the vehicle 1. Thereby, one end side of the drive link 8 can be disposed more rearwardly. Thereby, the drive link 8 is structured more longer so as to make the vertical stroke of the plate member 3 larger. Further, the sub rail 7b of the rail frame 7 guides the pivotal support pin 22 so as to stably transfer the drive link 8.

Further, according to the lifter 2 of the embodiment, the plate member 3 is disposed on the plate member frame 10 so as to be removed. Thereby, the driver or the like can use the plate member 3 not only for approximately closing the storage concave portion 5 but for removing the plate member 3 out of the vehicle 1 side to use as a top panel of the table outside the vehicle 1.

Here, in the embodiment, although the first upper slider 23 is transferred in the lengthwise direction of the vehicle 1 by driving the second electric motor 26 so as to transfer the plate member 3 in the lengthwise direction of the vehicle 1, the second upper slider 24 may be driven. In this case, if the first upper slider 23 is structured to freely transfer in the lengthwise direction of the vehicle 1, the second upper slider 24 can transfer in the lengthwise direction of the vehicle 1 by driving the second electric motor 26. Thereby, the plate member 3 is transferred in the lengthwise direction of the vehicle 1.

Further, although the second electric motor 26 disposed on the plate member frame 10 is shown, it goes without saying that the second electric motor 26 may be disposed on the stiffening member 25. In this case, as well as the first electric motor 11, it is preferable that the second electric motor 26 is connected to the first upper slider 23 through the push-pull type wire.

Further, in the embodiment, although the plate member 3 and the plate member frame 10 transferred in the lengthwise direction of the vehicle 1 with respect to each link 8 and 9 by the second electric motor 26 are shown, for example, the plate member frame 10 may be transferred right and left.

Further, the first upper slider 23 and the second upper slider 24 may be driven together by the second electric motor 26. In this case, it is preferable that the screw spiral is inverted on the first upper slider 23 side and the second upper slider 24 side so as to screw the worm gear 27 on the second upper slider 24. Therefore, each slider 23 and 24 approach or separate each other by driving the second electric motor 26. In other words, the drive link 8 and the driven link 9 can be shifted to the raised state or the approximately horizontal state. Therefore, the first electric motor 11 and the second electric motor 26 can be synchronized so that each first electric motor 11 and 26 can cooperate. Thereby, the plate member 3 can be transferred up and down so as to reduce the load of the first electric motor 11. In this case, for example, even if the lower slier 12 side is not contacted with the drive link 8 side in the initial transfer zone IS of the lower slider 12, the second electric motor 26 is supplementarily driven so as to shift the drive link 8 from the approximately horizontal state to the raised state of the predetermined angle.

Figure 11:
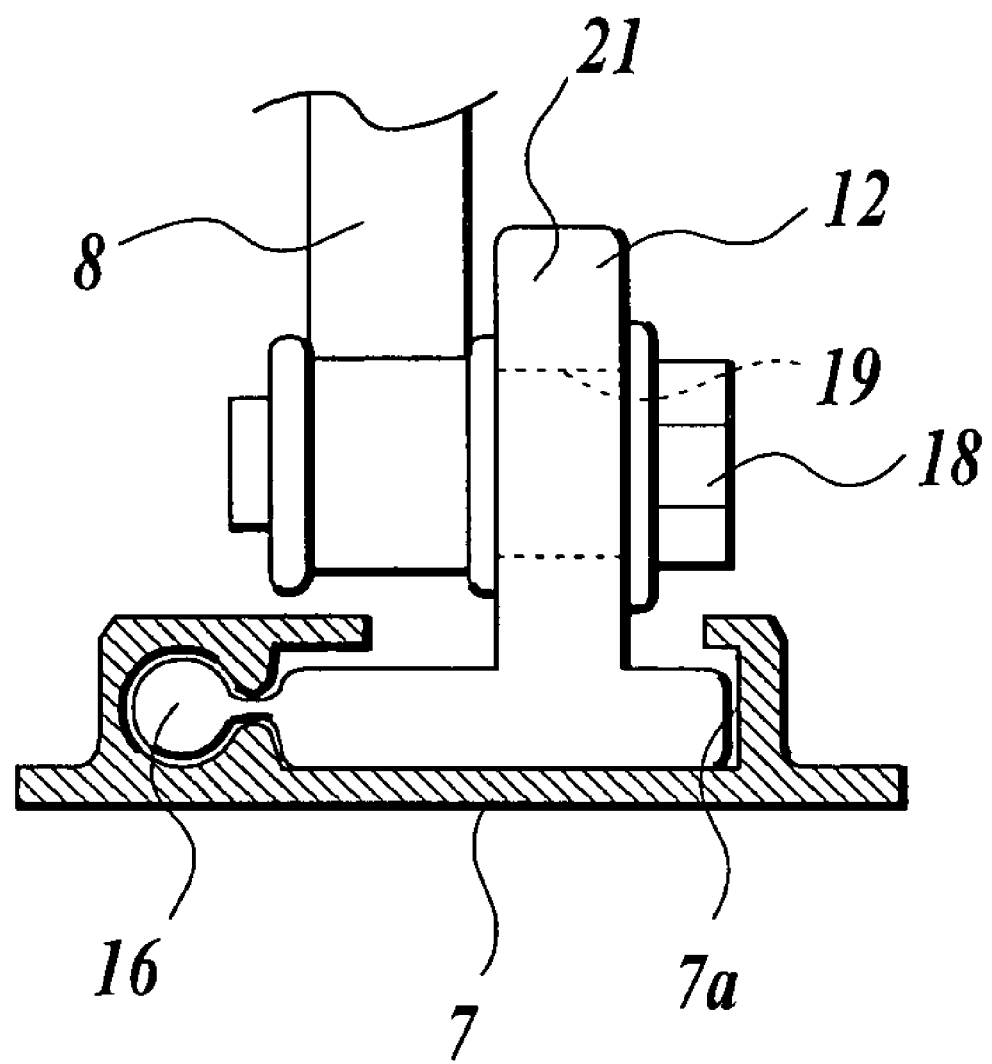
FIG. 11 is the front sectional view of the rail frame.

Further, in the embodiment, although the driving force of the lower slider 12 is transmitted to the drive link 8 side, as shown in FIG. 11, the pivotal support pin 22 of the drive link 8 is penetrated direct through the transfer guide groove 19 of the lower slider 12. In this case, the sub rail 7b guiding the pivotal support pin 22 in the lengthwise direction of the vehicle 1 can be removed.

Further, in the embodiment, although each right and left lower sliders 12 transferred by one first electric motor 11 is shown, each lower slider 12 may be separately driven by two electric motors 11, 26. In this case, each lower slider 12 is separately controlled so as to reduce the load of each electric motor 11 or 26. Thereby, the luggage capacity of the plate member increases. Further, the output torque of each electric motor 11 or 26 can be changed in accordance with the weight distribution applied from the plate member 3 to each right and left links 8 and 9 in the case of that the luggage is not equally mounted on the right and left sides of the plate member 3.

Further, in the embodiment, although the wire 16 transferring the lower slider 12 is shown, as well as the first upper slider 23, the worm gear 27 may transfer the lower slider 12.

Further, in the embodiment, although the wire 16 is connected with the inside of the right and left lower sliders 12, as shown in FIG. 11, the wire 16 may be connected with the outside of the right and left lower sliders 12.

Figure 12:
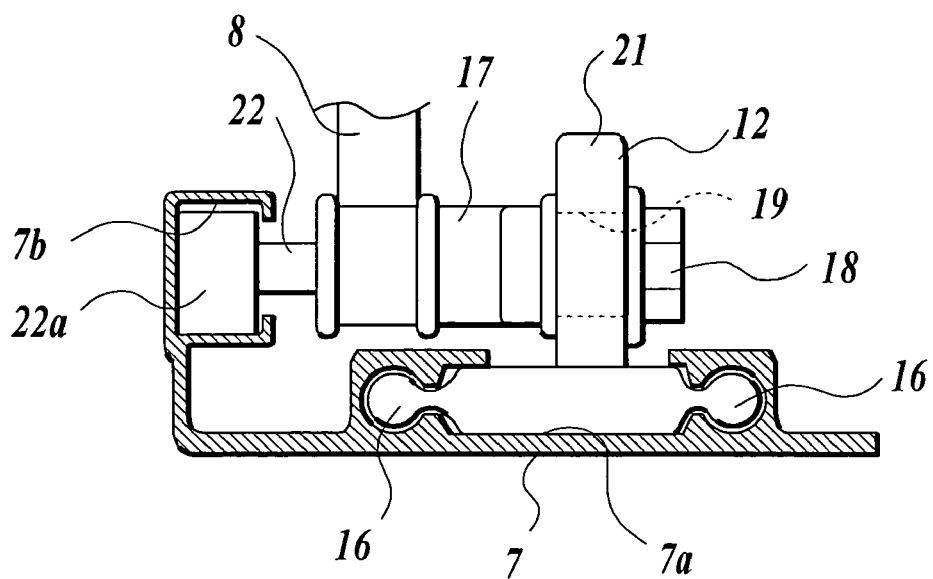
FIG. 12 is the front sectional view of a first modified rail frame.

Further, as shown in FIG. 12, it is possible that the wire 16 is connected on both right and left sides of the lower slider 12. In this case, the lower slider 12 can be approximately equally pushed and pulled on the right and left sides. Thereby, the moment caused in the lower slider 12 or the like is reduced, and the endurance, the credibility or the like thereof is enhanced.

Figure 13:
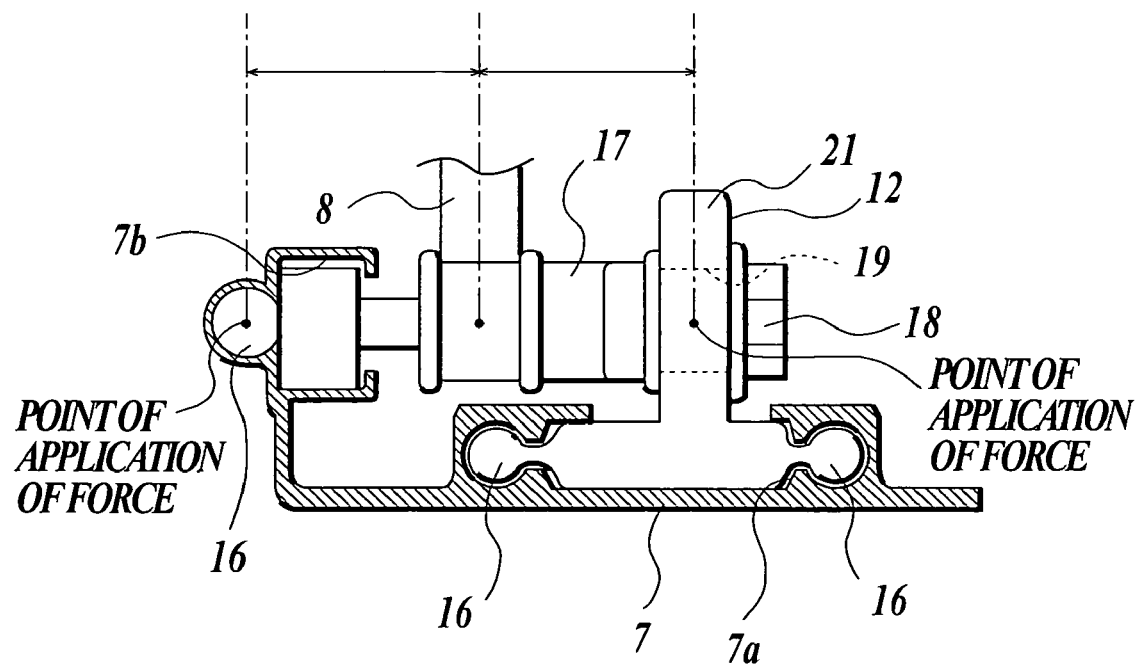
FIG. 13 is the front sectional view of a second modified rail frame.

Further, as shown in FIG. 13, the wire 16 may also be connected with the pivotal support pin 22. In this case, as shown in FIG. 13, when a point of the force applied from the wire 16 connected with the pivotal support pin 22 to the drive link 8 is symmetrical to one from the lower slider 12 thereto, the lower slider 12 can be more stably pushed and pulled.

Figure 14:
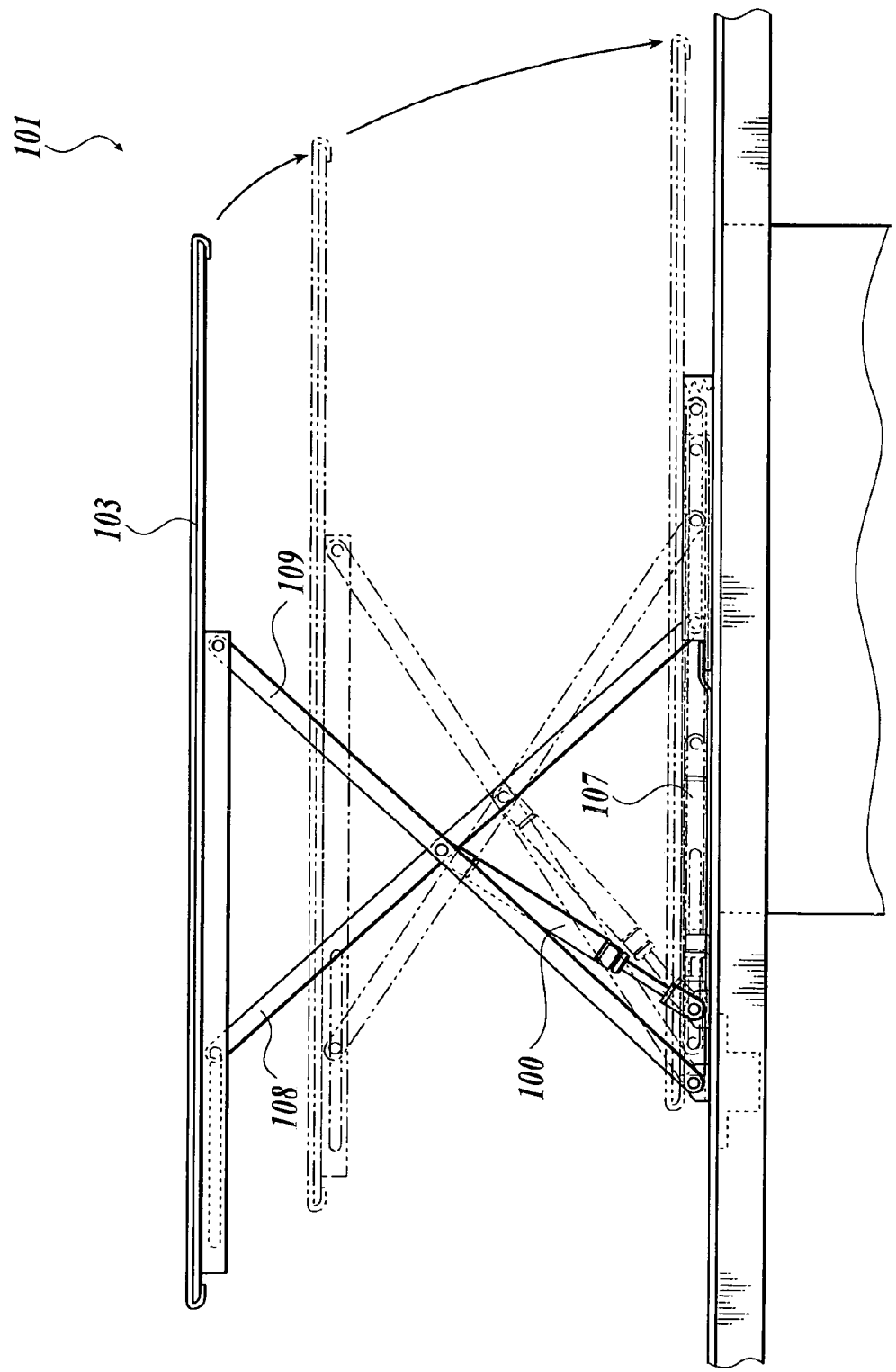
FIG. 14 is a schematic side view of a modified lifter in which a gas stay raises the plate member.

Further, in the embodiment, although the driving member having the first electric motor 11 is shown, the driving member may have a biasing force such as a gas stay, a spring and a hydraulic circuit or the like. In FIG. 14, the gas stay 100 is used as the driving member. The lifter 101 shown in FIG. 14 as well as the embodiment also has a pair of rail frames 107 which is disposed in the predetermined flat surface and which is parallel to each other, and the drive link 8 and the driven link 9 which are connected with the plate member 103 side and the rail frame 107 side. In this case, by assuming that the drive link 108 and the driven link 109 are different each other in length, the plate member 103 transfers in the longitudinal direction of the rail frame 107 while transferring up and down.

Further, in the embodiment, although the storage concave portion 5 formed as a spare tire storage portion for adjusting the luggage space 2a is shown, the storage concave portion 5 is not limited to this configuration, and may be formed to project downward on the floor panel 4, for example, formed as a passenger compartment or the like on the middle side of vehicle 1. Other features or the like can be accordingly modified in details.

Further, in the embodiment, although the lifter 2 of the present invention disposed in the vehicle 1 is shown, as described above, for example, even if the lifter 2 is disposed in the narrow space such as the loft of the house sloped in the upper position, the same efficiency as the embodiment can be obtained. Also, the other features or the like can be accordingly modified in details.

Second Embodiment

Figure 15:
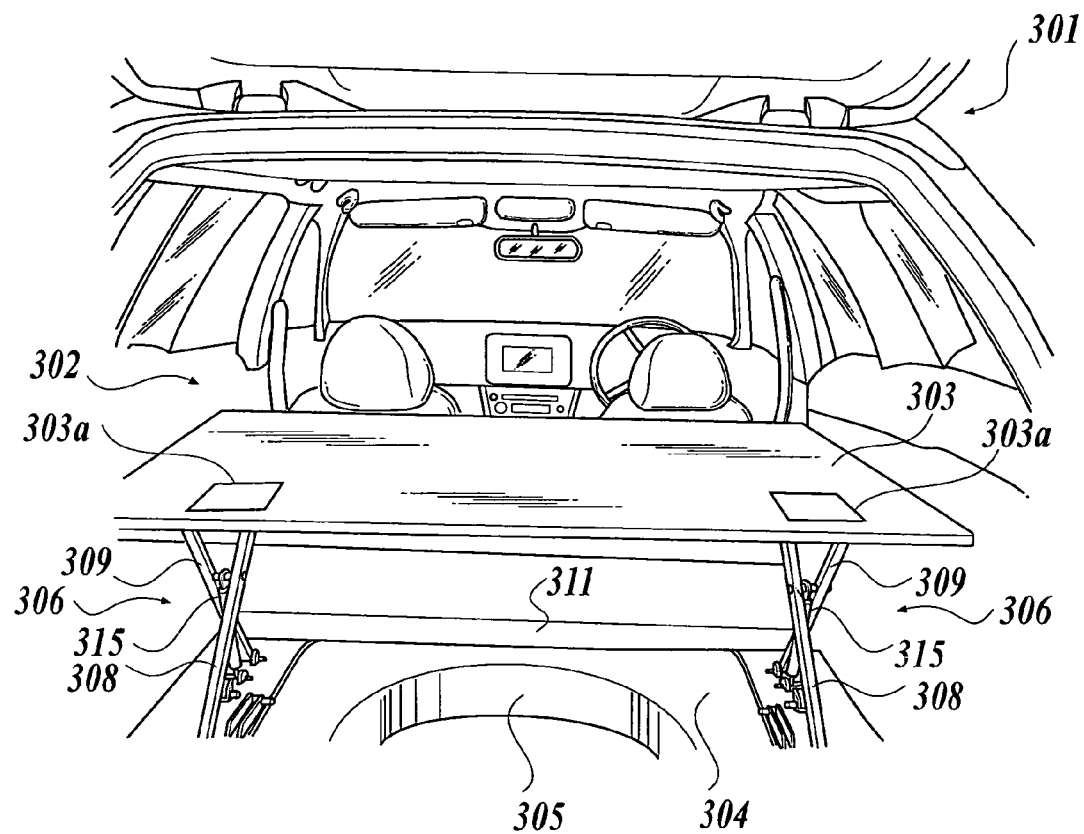
FIG. 15 is an outside perspective view showing an inside of the vehicle according to the second embodiment.
Figure 16:
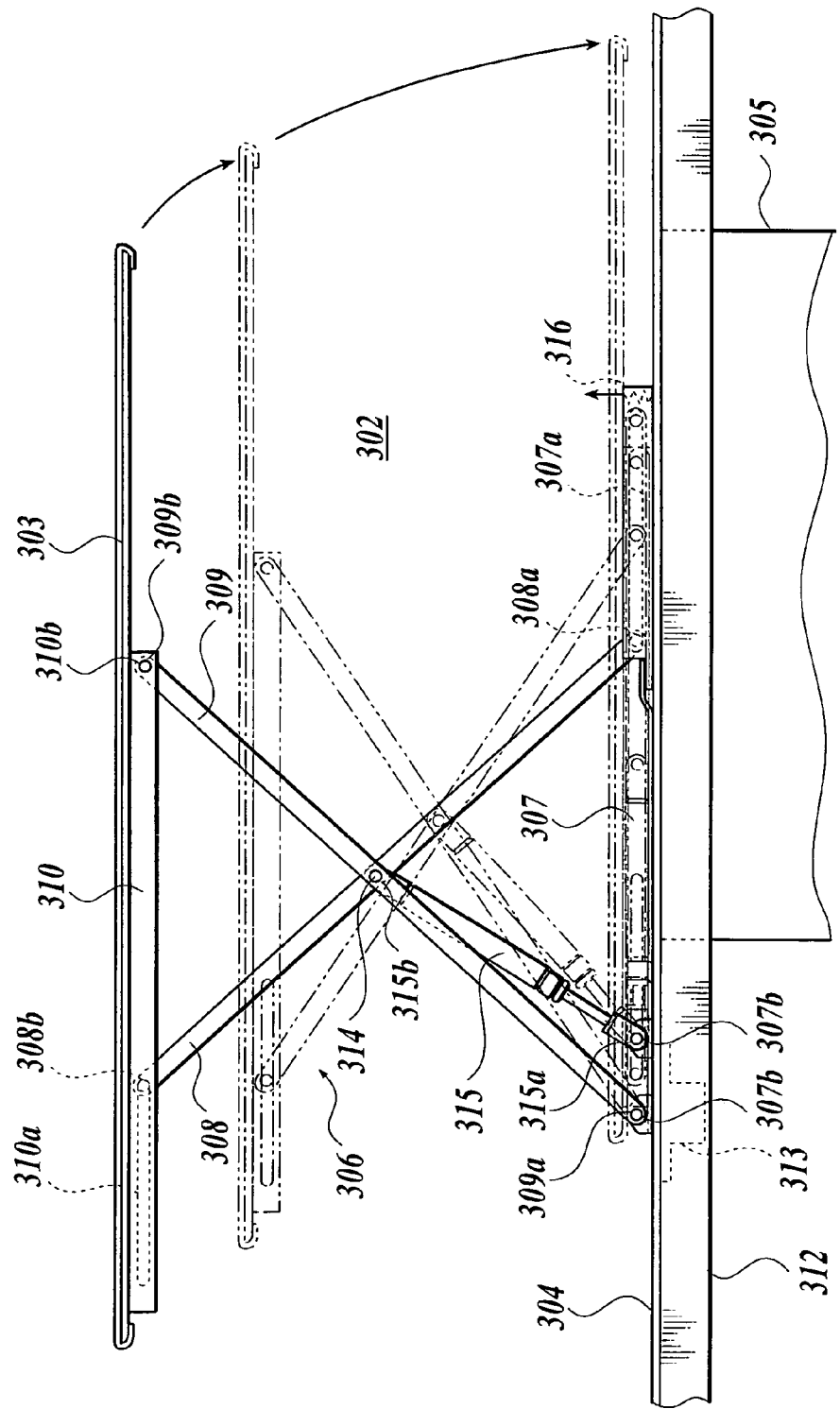
FIG. 16 is a side view of the luggage storage structure of an automobile.
Figure 17:
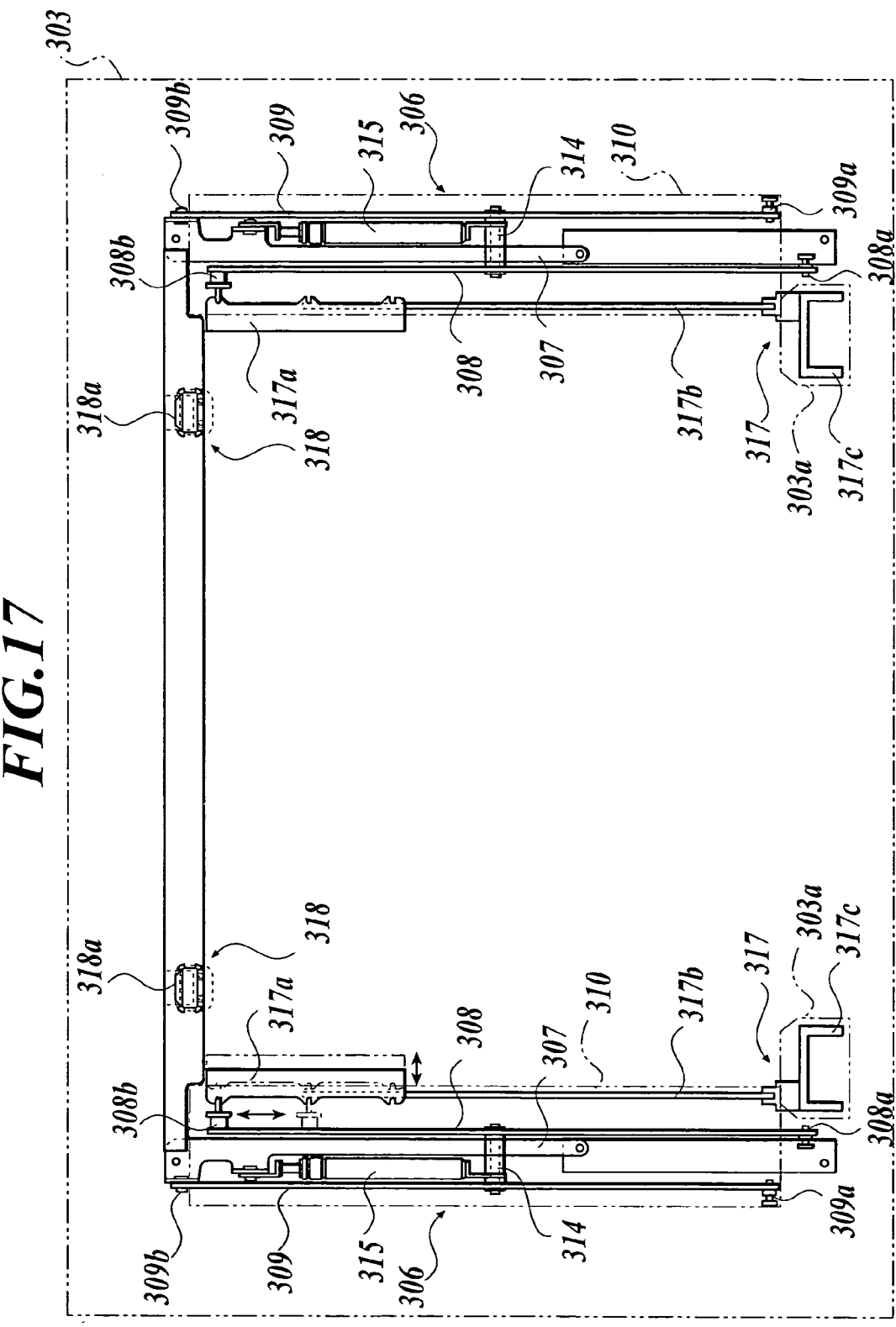
FIG. 17 is a plan view of the luggage storage structure of the automobile.
Figure 18:
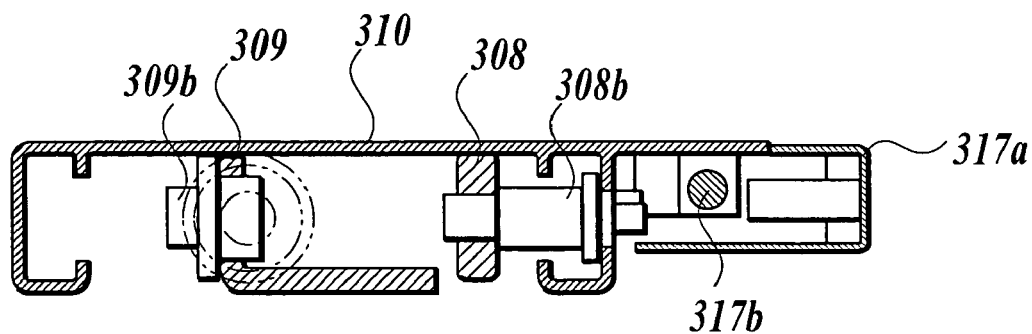
FIG. 18 is the front sectional view of the plate member frame.
Figure 19:
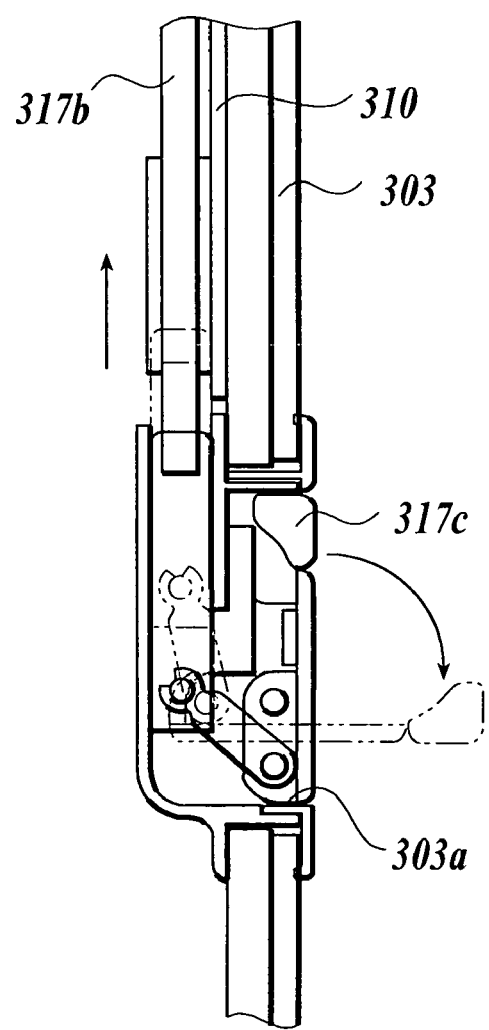
FIG. 19 is a side sectional view in the vicinity of the aperture which is formed on the plate member and grasped.

FIGS. 15 to 19 show a second embodiment of the present invention. FIG. 15 is an externally perspective view inside the vehicle. FIG. 16 is a side view of the luggage storage structure of an automobile. FIG. 17 is a plan view of the luggage storage structure of an automobile. FIG. 18 is a front sectional view of the plate member frame. FIG. 19 is a side sectional view in the vicinity of the aperture which is formed on the plate member for grasping by hand.

As shown in FIG. 15, the luggage storage structure for this automobile transfers approximately up and down a plate member 303 disposed in a luggage space 302 of the vehicle 301. The plate member 303 approximately closes an upper part of a storage concave portion 305 formed so as to project downward on a floor panel 304. In other words, the plate member 303 is a bottom of the luggage space 302 when being lowered. The plate member 303 opens the storage concave portion 305 and approximately separates the luggage space 302 into the upper portion and the lower portion when raised. In the embodiment, the vehicle 301 is a wagon having the luggage space 302 rearward. The storage concave portion 305 is an approximately circular spare tire storage portion formed in the floor panel 304. In other words, the luggage is stored in the upper portion of the spare tire stored in the spare tire storage portion.

As shown in FIG. 15, the plate member 303 is formed approximately quadrangle and supported by the transfer mechanism 306 so as to transfer approximately up and down. The transfer mechanism 306 is disposed in the floor panel 304. As shown in FIG. 16, this transfer mechanism 306 has a pair of rail frames 307 fixed on the floor panel 304 side and approximately parallel each other, and a main link 308 and a driven link 309. One end side of the main link 308 and the driven link 309 is respectively connected with the rail frame 307, and the main link 308 and the driven link 309 form the approximately X-shape when the plate member 303 is transferred upward. In the embodiment, as shown in FIG. 16, a plate member frame 310 is disposed on a lower surface of the plate member 303. Each main link 308 and each driven link 309 are respectively connected with the plate member frame 310.

Each rail frame 307 extends in the lengthwise direction of the vehicle 1 and the front end side thereof is linked with a link 311 extending right and left. In the embodiment, each rail frame 307 and the link 311 are respectively fixed outside the storage concave portion 305 of the floor panel 304. Each rail frame 307 is fixed along a rear side member 312 disposed on a lower surface of the floor panel 304. The link 311 is fixed along a rear cross member 313 disposed on a lower surface of the floor panel 304.

As shown in FIG. 16, each rail frame 307 has a transfer guide groove 307a penetrating a transfer pin 308a. The transfer pin 308a is formed on one end side of the main link 308 and extends approximately right and left. The transfer guide groove 307a is formed so as to extend in the lengthwise direction of the vehicle 1 in the rearward of the rail frame 307. The transfer pin 308a can transfer in the lengthwise direction of the vehicle 1.

Further, each rail frame 307 has a rotating aperture 307b penetrating a rotating pin 309a. The rotating pin 309a is formed on one end side of the driven link 309 and extends approximately right and left. The rotating aperture 307b is formed in a front position of the rail frame 307. The rotating pin 9a can rotate around the rotating aperture 307b.

In the embodiment, as shown in FIG. 17, a plate member frame 310 extends in the lengthwise direction of the vehicle 1, and is respectively disposed on both right and left sides. Each plate member frame 310 is disposed in an upper portion of each rail frame 307, and one end side of each plate member frame 310 is linked by a stiffening member 310c extending approximately right and left.

As shown in FIG. 16, each plate member frame 310 has a transfer guide groove 310a penetrating a transfer pin 308b. The transfer pin 308b is formed on the other side of the main link 308 and extends approximately right and left. The transfer guide groove 310a is formed so as to extend back and forth in a front position of the plate member frame 310. The transfer pin 308b can transfer in the lengthwise direction of the vehicle 1.

Further, each plate member frame 310 has a rotating aperture 310b penetrating a rotating pin 309b. The rotating pin 309b is formed on the other end side of the driven link 309 and extends approximately right and left. The rotating aperture 310b is formed in the rearward of the plate member frame 310. The rotating pin 309b can rotate around the rotating aperture 310b.

As described above, both end sides of each main link 308 are respectively connected with the rail frame 307 and the plate member frame 310 so as to transfer in the lengthwise direction of the vehicle 1. Further, both end sides of each driven link 309 are respectively connected with the rail frame 307 and the plate member frame 310 so as to rotate. The middle sides of each main link 308 and each driven link 309 are connected each other so as to rotate.

In other words, as the transfer pin 308a of the rail frame 307 side of each main link 308 transfers rearward and the transfer pin 308b of the plate member frame 310 side transfers forward, each main link 308 is raised. At this time, because each driven link 309 is connected with each main link 308 so as to rotate, each main link 308 and each driven link 309 are raised together. Further, because each link 308 and 309 is raised, as shown in FIG. 16, the plate member 303 is transferred upward.

Further, as the transfer pin 308a of the rail frame 307 side of each main link 308 transfers forward and the transfer pin 308b of the plate member frame 310 side transfers rearward, each main link 308 is approximately horizontal and each driven link 309 is approximately horizontal. Thereby, as shown in FIG. 16, the plate member 303 is lowered. Further, in the embodiment, as shown in FIG. 16, the transfer trajectory of the plate member 303 is approximately circular shape along the backdoor or the like.

In the embodiment, as shown in FIG. 17, each main link 308 and each driven link 309 are linked through a rotating pin member 314. This rotating pin member 314 is connected with a gas stay 315, and one end thereof is connected with the rail frame 307. The gas stay 315 can extend and contract, and provides a biasing force in the extending direction. The gas stay 315 extends and contracts between the plate member 303 and each rail frame 307. Here, the inner structure of the gas stay 315 is not described because it is the same structure as a conventional one.

A rotating pin 315a extending approximately right and left is formed on one end side of the gas stay 315. This rotating pin 315a is structured so as to penetrate the rotating aperture 307c of the rail frame 307. This rotating aperture 307c is formed in a front position of the rail frame 307. The rotating pin 315a can rotate around the rotating aperture 307c. Further, a pin aperture 315b penetrating the rotating pin member 314 is formed on the other end side of the gas stay 315. Thereby, the gas stay 315 together with each main link 308 and each driven link 309 are raised and approximately horizontal. Further, in the embodiment, this rotating aperture 307c is formed in the rear side of the rotating aperture 307b of the driven link 309. Thereby, as shown in FIG. 16, when the plate member 303 transfers upward, the raised angle of the gas stay 315 increases in comparison with the driven link 309. Each main link 308 and each driven link 309 are biased by this gas stay 315 so as to be raised. Thereby, the plate member 303 side is biased so as to transfer upward.

As shown in FIG. 16, when the storage concave portion 305 is approximately closed by the plate member 303, the gas stay 315 that is approximately horizontal is gradually raised as the plate member 303 transfers upward. Here, because the gas stay 315 has the biasing force of the extending direction, the upward biasing force increases as the angle between the gas stay 315 and the plate member 303 increases. In other words, because the biasing force of the gas stay 315 increases as the plate member 303 is raised, the plate member 303 is slowly raised when opening the storage concave portion 305 and the plate member 303 is stably raised after transferring at the predetermined height. Further, when the gas stay 315 is approximately horizontal, the biasing force is applied to the approximately horizontal direction. In other words, when the plate member 303 approximately closes the storage concave portion 305, the biasing force of the gas stay 315 is not applied upward at all.

In the embodiment, as shown in FIG. 16, a spring member 316 is disposed in each rail frame 307 and biases upward the plate member 303 approximately closing the storage concave portion 305. In other words, when the storage concave portion 305 is approximately closed by the plate member 303, the biasing force of the spring member 316 as an initial biasing member is applied to the plate member 303 side. Thereby, when the lock of the lock mechanism 317 is unlocked, the plate member 303 is transferred upward by the spring member 316. Further, as the gas stay 315 is raised and applying more of the upward biasing force to the plate member 303 side, the plate member 303 is transferred upward by the biasing force of the gas stay 315.

Thereby, when the storage concave portion 305 is approximately closed by the plate member 303, the biasing force of the gas stay 315 is not applied upward to the plate member 303 side at all. But the plate member 303 can be raised by the spring member 316 to the position where the biasing force of the gas stay 315 is applied.

Further, as shown in FIG. 17, a lock mechanism 317 disposed on the plate member frame 310 side locks the plate member 303 at the position where the storage concave portion 305 is approximately closed, and capable of locking the plate member 303 at the multistage vertical position. The lock mechanism 317 has a lock plate 317a, a rod 317b and a lever 317c. The lock plate 317a is disposed inside the right and left main links 308 and can transfer approximately right and left. The rod 317b contacts with this lock plate 317a and transfers the right and left lock plates 317a to the inside each other. The lever 317c is connected with the rod 317b.

As shown in FIG. 17, the lock plate 317a is disposed along the transfer guide groove 310a of the plate member frame 310. A notch 317d capable of receiving the end of the transfer pin 308a is juxtaposed in the lengthwise direction of the vehicle 1. The lock plate 317a is biased on the transfer pin 308a side. Because the transfer pin 308a engaging the notch 317d is not released unless the right and left lock plates 317a is transferred to the inside each other, the driven link 308 cannot transfer. In the embodiment, the notch 317d is formed with respect to the position where the plate member 303 can approximately close the storage concave portion 305, the position where the plate member 303 is completely raised and the middle position thereof. In other words, the lock mechanism 317 functions as a closing mechanism and a positioning mechanism. The closing mechanism locks the plate member 303 at the position where the plate member 303 can approximately close the upper part of the storage concave portion 305. The positioning mechanism can lock the plate member 303 at the multistage vertical position.

The rod 317b extends and can transfer in the lengthwise direction of the vehicle 1. As the rod 317b transfers forward, the front end side thereof contact with the lock plate 317a and the right and left lock plates 317a transfer to the inside each other.

The lever 317c is connected through a plurality of links with the rear end side of the rod 317b. The lever 317c is disposed inside the aperture 303a formed in the plate member 303 and grasped by the hand. As shown in FIG. 19, the lever 317c can rotate with respect to the plate member 303. By rotating the lever 317c so as to project from the plate member 303, the rod 317b transfers forward. In the embodiment, the lever 317c is a height-adjustable operating portion capable of unlocking.

In this embodiment, the plate member 303 and the plate member frame 310 are locked by a fixing portion 318 disposed in the stiffening member 310c. The lock of the fixing portion 318 can be unlocked by the operating portion 318a disposed on a lower surface of the plate member 303.

In this embodiment, the leg device 100 for the table and the folding chair 200 according to the first embodiment can be also disposed on the lower surface of the plate member 303 like the first embodiment. The description of the leg device for table and the folding chair is omitted.

Here, the following will describe the luggage storage structure for transferring the plate member 303 up and down.

When the plate member 303 is at a lower position, the storage concave portion 305 is approximately closed by the plate member 303. The luggage can be stored in the storage concave portion 305 by transferring the plate member 303 upward. The plate member 303 is locked by the lock mechanism 317 when approximately closing the storage concave portion 305. When the lock mechanism 317 is unlocked, the plate member 303 is transferred upward by the biasing force of the gas stay 315. Here, because the gas stay 315 smoothly extends, the plate member 303 cannot be suddenly moved when the lock mechanism 317 is unlocked.

At this time, as one end side of each main link 308 transfers from one end side of each rail frame 307 to the other end side of each rail frame 307 and the other end side of each main link 308 transfers opposite to one end side of each main link 308, each main link 308 and each driven link 309 form the approximately X-shape and are raised.

Further, the plate member 303 transfers upward, and thereby the plate member 303 approximately separates the luggage space 302 into the upper portion and the lower portion. At this time, the luggage can be mounted not only on the floor panel 304 side such as the storage concave portion but also on the plate member 303 side.

Further, the plate member 303 that was biased upward can be locked at each of the predetermined vertical position. Therefore, in accordance with the size of the luggage stored in the luggage space 302, the vertical position of the plate member 303 can be adjusted and the vertical separating position of the luggage space 302 can be easily adjusted. Further, adjusted the height of the plate member 303, the user uses the lever 317c disposed inside the aperture so as to unlock the plate member 3 from the positioning mechanism 317 and transfer the plate member 303. Here, because the lever 317c is disposed inside the aperture, the luggage mounted on the plate member 303 cannot contact with the lever 317c.

For example, the user applies a downward force to the plate member 303 transferred upward, the plate member 303 stops at the position where the storage concave portion 305 is approximately closed, and the plate member 303 is locked by the lock mechanism 317. At this time, because the gas stay 315 is contracted by the biasing force, when the plate member 303 lowered, the plate member 303 cannot be suddenly moved. Further, each main link 308 and each driven link 309 are approximately horizontal by transferring one end side of each main link 308 from the other end side of each rail frame 307 to one end side thereof.

Here, the user can grasp the aperture 303a which is formed on the plate member 303 and grasped by hand, and transfer the plate member 303. Further, because the plate member 303 is removable from each main link 308 side and each driven link 309 side, the user can grasp the aperture 303a so as to transfer the plate member 303 separated from each link 308 and 309.

Therefore, according to the luggage storage structure of this embodiment, the luggage stored in the storage concave portion 305 cannot be reached because the storage concave portion 305 is approximately closed by the plate member 303. Further, the luggage is reliably hidden by the plate member 303 so as to keep the luggage secret inside the vehicle 1.

Further, according to the luggage storage structure of this embodiment, the luggage can be stored by using the common spare tire storage portion formed in the floor panel 304. Further, the luggage can be mounted on both of the floor panel 304 side and the plate member 303 side. Thereby, because the capacity of the luggage space 302 is additionally increased, the luggage storage is quite convenient for the practical use.

Further, according to the luggage storage structure of this embodiment, both end sides of each main link 308 transfer in the longitudinal direction of the rail frame 307 so that the plate member 303 transfers up and down. Thereby, the plate member 303 can be smoothly transferred up and down. Further, the plate member 303 can be supported by two links of each main link 308 and each driven link 309 so as to stably support the plate member 303.

Further, according to the luggage storage structure of this embodiment, because the plate member 303 can be handled by using the aperture 303a, the luggage storage structure additionally enhances the convenience for usages. Further, because the lever 317c is disposed inside the aperture 303a, the luggage cannot contact with the lever 317c nor unlock the lock. Thereby, the lock mechanism 317 can securely lock the plate member 303.

Further, according to the luggage storage structure of this embodiment, the plate member 303 can be smoothly transferred up and down by the gas stay 315 so that the user can reliably transfer the plate member 303. Further, because the plate member 303 cannot be suddenly moved, an excess load or the like does not occur in the transfer mechanism 306 or the like. Thereby, the reliability and the durability of the transfer mechanism 306 can be additionally enhanced.

Further, according to the luggage storage structure of automobile of the embodiment, because the plate member 303 is structured so as to be removed with respect to the plate member frame 310, the user can remove the plate member 303 out of the vehicle 1 and use it for example as a top plate for the table. Thereby, the plate member 303 can be used for other purposes than those of approximately closing the storage concave portion 305.

Further, because the lever 317c is disposed inside the aperture 303a that can be grasped by the hand, when the storage concave portion 305 is approximately closed, the fixation between the plate member 303 and the plate member frame 310 cannot be unlocked. Thereby, for example by removing the key of the automobile and setting the close locking mechanism 317 make it impossible to be unlocked, even when the thief or the like smashes the key to the vehicle 1 and sneaks inside the vehicle 1, the luggage stored in the storage concave portion 305 can be reliably secured.

Further, according to the luggage storage structure of this embodiment, because each rail frame 307 is disposed along the rear side member 312 of vehicle body, the load applied from each link 308 and 309 is applied to the rear side member 312 so as to prevent the floor panel 304 from deformation and effectively increase the luggage capacity of the plate member 303. Further, because the link member 311 is disposed along the rear cross member 313, which also prevents the floor panel 304 from deformation and increases the luggage capacity of the plate member 303.

Further, although the above embodiment shows that the plate member 303 side is biased upward by the gas stay 315, the plate member 303 may be biased upward by the elastic body such as the spring.

Further, although the above embodiment shows that the gas stay 315 is connected with the rotating pin 314, the gas stay 315 may be connected for example with the plate member frame 310. Any kinds of the structure may be used to bias the plate member 303 upward.

Further, although the above embodiment shows that the storage concave portion 305 is a spare tire storage portion formed so as to meet the luggage space 302, the storage concave portion 305 is not limited to this configuration. The storage concave portion 305 may be formed to project downward on the floor panel 304 for example formed in the passenger space of the middle side of vehicle 1.

Further, although the above embodiment shows that one lock mechanism 317 functions as the locking and positioning mechanism, two lock mechanisms may be used so as to cope with each mechanism.

Further, although the above embodiment shows that the height adjustable operating portion is a rotatable lever 317c, the height adjustable operating portion may be a button for unlocking the lock mechanism 317 by pushing thereon. Also, other features can be accordingly modified in details.

The entire disclosure of Japanese Patent Applications No. Tokugan 2003-038449, 2003-038460 and 2003-038486 filed on Feb. 17, 2003 including specifications, claims, drawings and summaries are incorporated herein by reference in its entirety.

What is claimed is:

1. A luggage storage structure for a vehicle with a concaved storage portion formed to protrude downward in a floor panel and a plate member provided to cover an upper portion of said concaved storage portion, comprising:
- a transfer mechanism for transferring said plate member up and down relative to said floor panel;
- a pair of rail frames fixed on said floor panel on opposite sides of said concaved storage portion and parallel to each other;
- a pair of drive links, a first end of each drive link being connected with one of said rail frames so as to transfer in a longitudinal direction of said rail frame, a second end of each drive link being connected with said plate member, said drive links being horizontal when said plate member closes said concaved storage portion, and said drive links being raised when said plate member is transferred upward;
- a pair of driven links, a first end of each driven link being connected with said plate member, a second end of each driven link being connected with said floor panel, each driven link being connected at a middle point of one of said drive links so as to rotate, said driven links being horizontal when said plate member closes said concaved storage portion and said driven links being raised when said plate member is transferred upward;
- a plurality of sliders that are capable of sliding in the longitudinal direction of said rail frame, said sliders engaging with said first ends of said drive links through a pair of connecting links; and
- a driving mechanism provided to slide each slider in the longitudinal direction of said rail frame, wherein
- each drive link and each driven link shift between an approximately horizontal state and a raised state by transferring said first end of each drive link along said rail frame,
- each drive link includes a contacting portion provided between said middle point of said drive link and said first end of said drive link,
- each of said sliders includes a contacting surface formed thereon to be brought into contact with said contacting portion,
- said contacting surface slopes in a direction in which said slider slides when said drive link shifts from said approximately horizontal state to said raised state;
- each of the sliders is provided with a transfer guide groove in the longitudinal direction of the rail frame, and
- a rotary connecting portion comprising one of said pair of connecting links which on one end is connected to said first end of said drive link so as to rotate, and on the other end is connected to a slide pin for transferring within the transfer guide groove.

2. The luggage storage structure as claimed in claim 1, wherein:
said concaved storage portion comprises is a spare tire storage portion, the plate member transferring approximately up and down in a luggage space of said vehicle.

3. The luggage storage structure as claimed in claim 1, further comprising:
a driving mechanism wherein two electric motors are disposed, and each slider is independently driven by each electric motor.

4. The luggage storage structure as claimed in claim 1, further comprising:
- a plate member frame for supporting the plate member, the plate member frame being connected with each drive link and each driven link, and the plate member frame transferring in a predetermined direction with respect to each drive link and each driven link; and
- a driving member for transferring the plate member frame in the predetermined direction.

5. The luggage storage structure as claimed in claim 1, further comprising:
- a plate member frame for supporting the plate member, the plate member frame being connected with each drive link and each driven link; and
- a lock mechanism for locking the plate member and the plate member frame having a release portion capable of unlocking the lock mechanism, the release portion of the lock mechanism being disposed on a lower surface of the plate member.

6. The luggage storage structure as claimed claim 1, wherein;
each of the rail frames comprises a main rail facing in a vertical direction for guiding the slider, and a sub rail facing in a vertical direction for guiding engagement of said drive link and said connecting link.

7. The luggage storage structure as claimed in claim 1, wherein:
the slider is formed to have an approximately T-shaped cross-section.

8. The luggage storage structure as claimed in claim 1, wherein:
on a lower side of the plate member is provided a leg set to horizontally support said plate member to allow said plate member to be a top plate of a table, and a folding chair to be used with said table.

9. The luggage storage structure as claimed in claim 1, wherein:
- an initial transfer zone of the contacting portion for contacting with the contacting surface so as to transmit a driving force of the slider to the drive links; and
- a normal transfer zone provided for the driving force to be transmitted from the slider through the rotating connection portion to the drive links.

10. The luggage storage structure as claimed in claim 1, wherein said pair of drive links are a different length than said pair of driven links.

11. The luggage storage structure as claimed in claim 1, wherein a middle point of each driven link is connected with said middle point of each drive link.

* * * * *